US011798538B1

(12) United States Patent
Parker et al.

(10) Patent No.: US 11,798,538 B1
(45) Date of Patent: Oct. 24, 2023

(54) ANSWER PREDICTION IN A SPEECH PROCESSING SYSTEM

(71) Applicant: Amazon Technologies, Inc., Seattle, WA (US)

(72) Inventors: Christopher Geiger Parker, Seattle, WA (US); Piyush Bhargava, Seattle, WA (US); Aparna Nandyal, Chennai (IN); Rajagopalan Ranganathan, Chennai (IN); Mugunthan Govindaraju, Chennai (IN); Vidya Narasimhan, Chennai (IN)

(73) Assignee: Amazon Technologies, Inc., Seattle, WA (US)

( * ) Notice: Subject to any disclaimer, the term of this patent is extended or adjusted under 35 U.S.C. 154(b) by 81 days.

(21) Appl. No.: 17/027,162

(22) Filed: Sep. 21, 2020

(51) Int. Cl.
| | |
|---|---|
| *G10L 15/18* | (2013.01) |
| *G06F 16/9032* | (2019.01) |
| *G10L 15/26* | (2006.01) |
| *G10L 15/183* | (2013.01) |
| *G10L 15/22* | (2006.01) |

(52) U.S. Cl.
CPC .... *G10L 15/1822* (2013.01); *G06F 16/90332* (2019.01); *G10L 15/183* (2013.01); *G10L 15/26* (2013.01); *G10L 2015/228* (2013.01)

(58) Field of Classification Search
CPC ... G10L 15/1822; G10L 15/183; G10L 15/26; G10L 2015/228; G06F 16/90332
See application file for complete search history.

(56) References Cited

U.S. PATENT DOCUMENTS

| 10,896,295 | B1 * | 1/2021 | Shenoy | G10L 15/187 |
|---|---|---|---|---|
| 2005/0177376 | A1 * | 8/2005 | Cooper | G10L 15/065 |
| | | | | 704/277 |
| 2016/0078870 | A1 * | 3/2016 | Helm | G10L 15/22 |
| | | | | 704/275 |
| 2017/0351532 | A1 * | 12/2017 | Li | G06F 9/453 |
| 2018/0054504 | A1 * | 2/2018 | Hart | G05D 23/1919 |
| 2018/0103151 | A1 * | 4/2018 | Erm | H04M 7/0006 |
| 2018/0159805 | A1 * | 6/2018 | Jones | G06Q 10/10 |
| 2018/0181648 | A1 * | 6/2018 | Chen | G06F 16/951 |
| 2019/0163780 | A1 * | 5/2019 | Ozcaglar | G06F 16/2423 |
| 2019/0237068 | A1 * | 8/2019 | Canim | G06F 16/90332 |
| 2020/0380991 | A1 * | 12/2020 | Ge | G10L 15/1815 |
| 2021/0224488 | A1 * | 7/2021 | Arya | G06N 5/04 |

* cited by examiner

*Primary Examiner* — Bhavesh M Mehta
*Assistant Examiner* — Darioush Agahi
(74) *Attorney, Agent, or Firm* — PIERCE ATWOOD LLP

(57) ABSTRACT

This disclosure relates to answer prediction in a speech processing system. The system may disambiguate entities spoken or implied in a request to initiate an action with respect to a target user. To initiate the action, the system may determine one or more parameters; for example, the target (e.g., a contact/recipient), a source (e.g., a caller/requesting user), and a network (voice over internet protocol (VOIP), cellular, video chat, etc.). Due to the privacy implications of initiating actions involving data transfers between parties, the system may apply a high threshold for a confidence associated with each parameter. Rather than ask multiple follow-up questions, which may frustrate the requesting user, the system may attempt to disambiguate or determine a parameter, and skip a question regarding the parameter if it can predict an answer with high confidence. The system can improve the customer experience while maintaining security for actions involving, for example, communications.

20 Claims, 19 Drawing Sheets

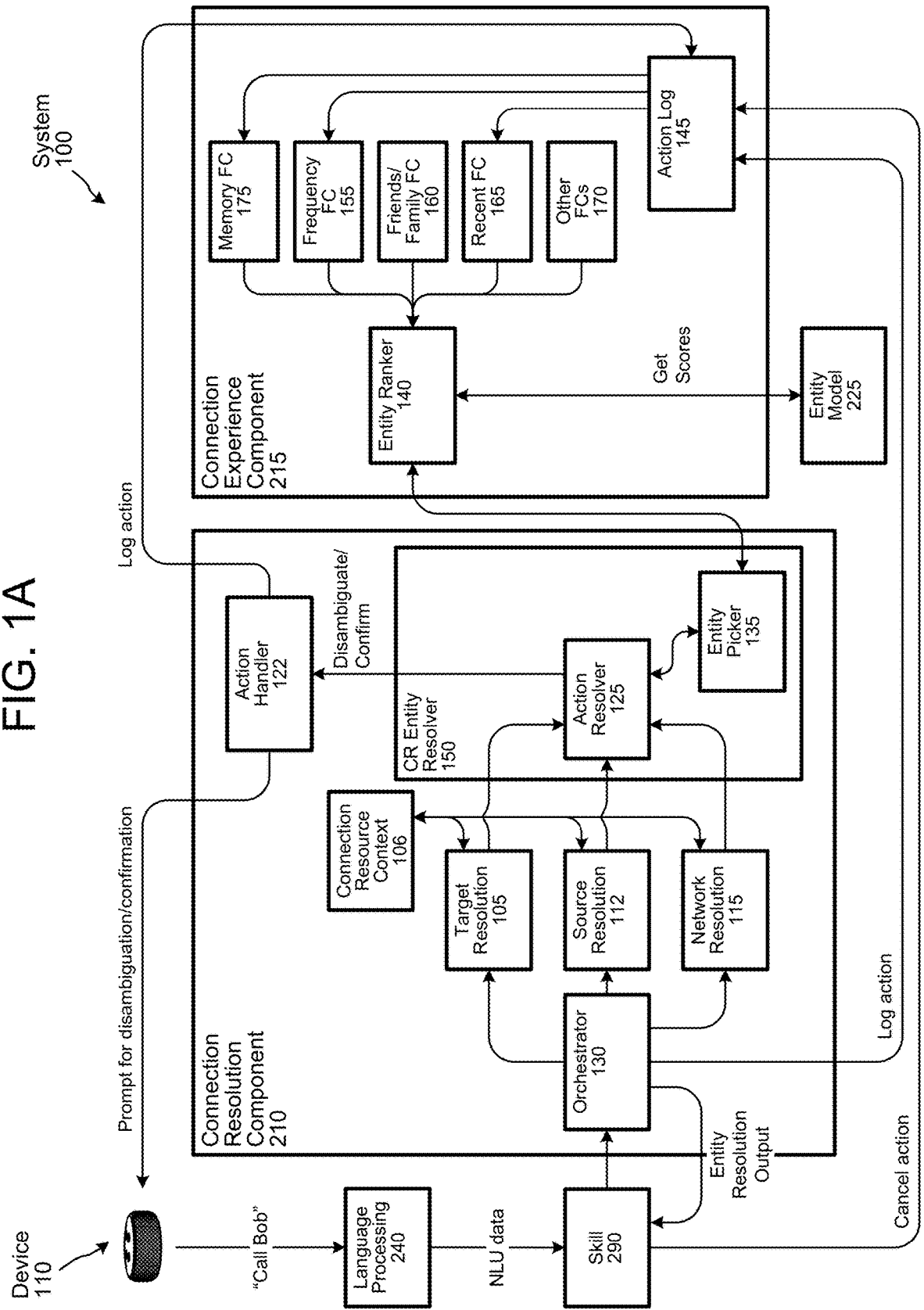

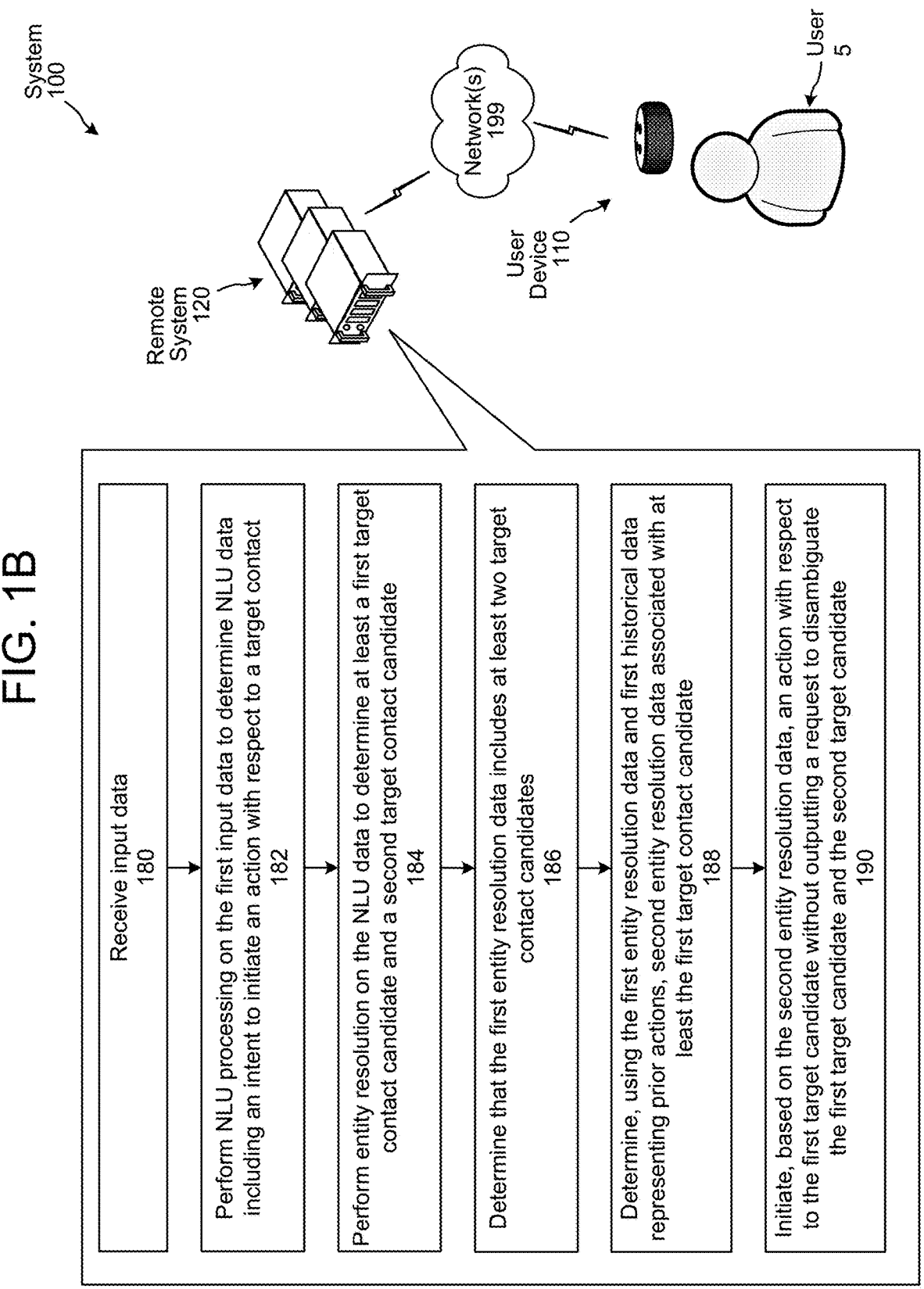

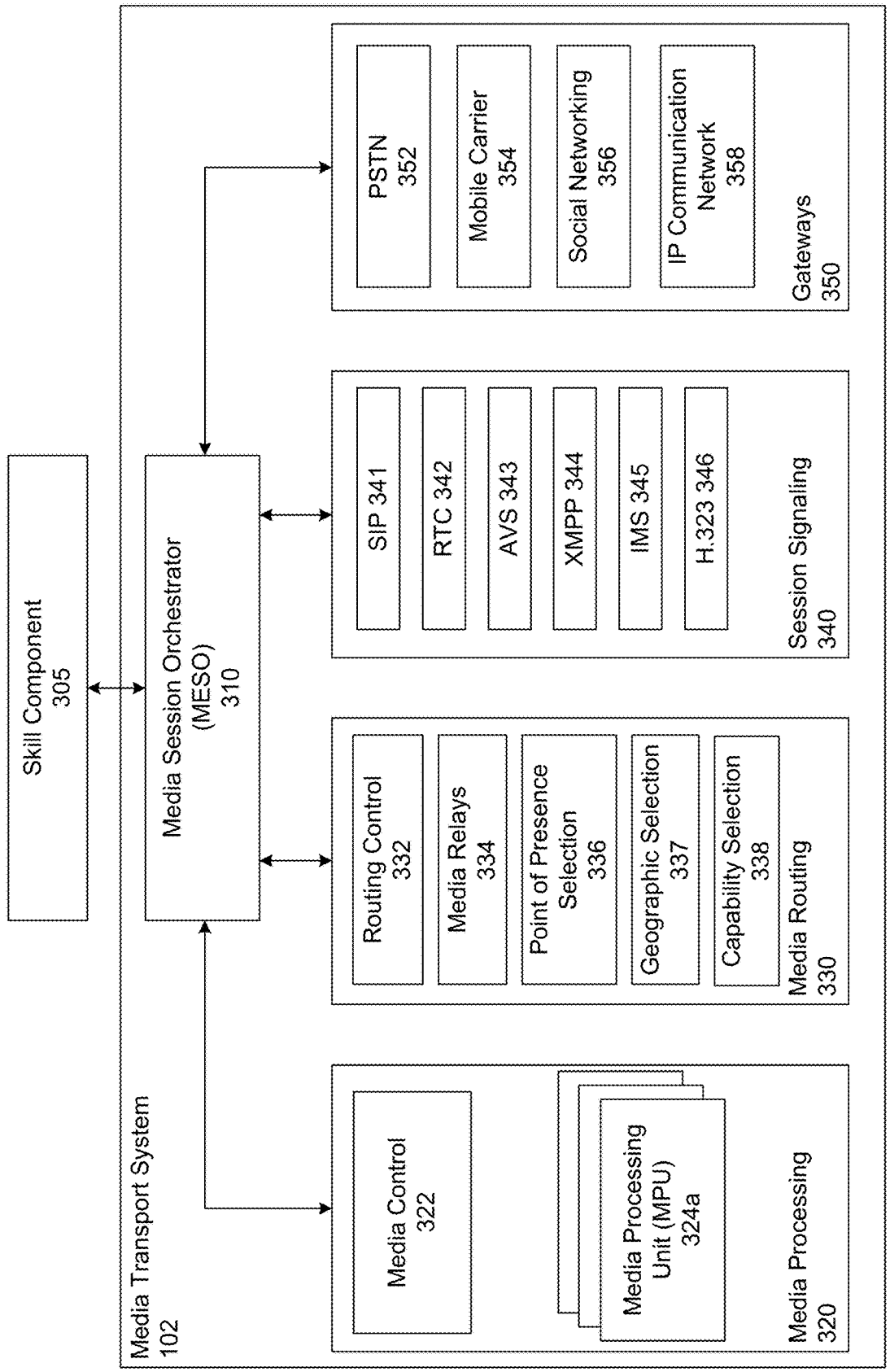

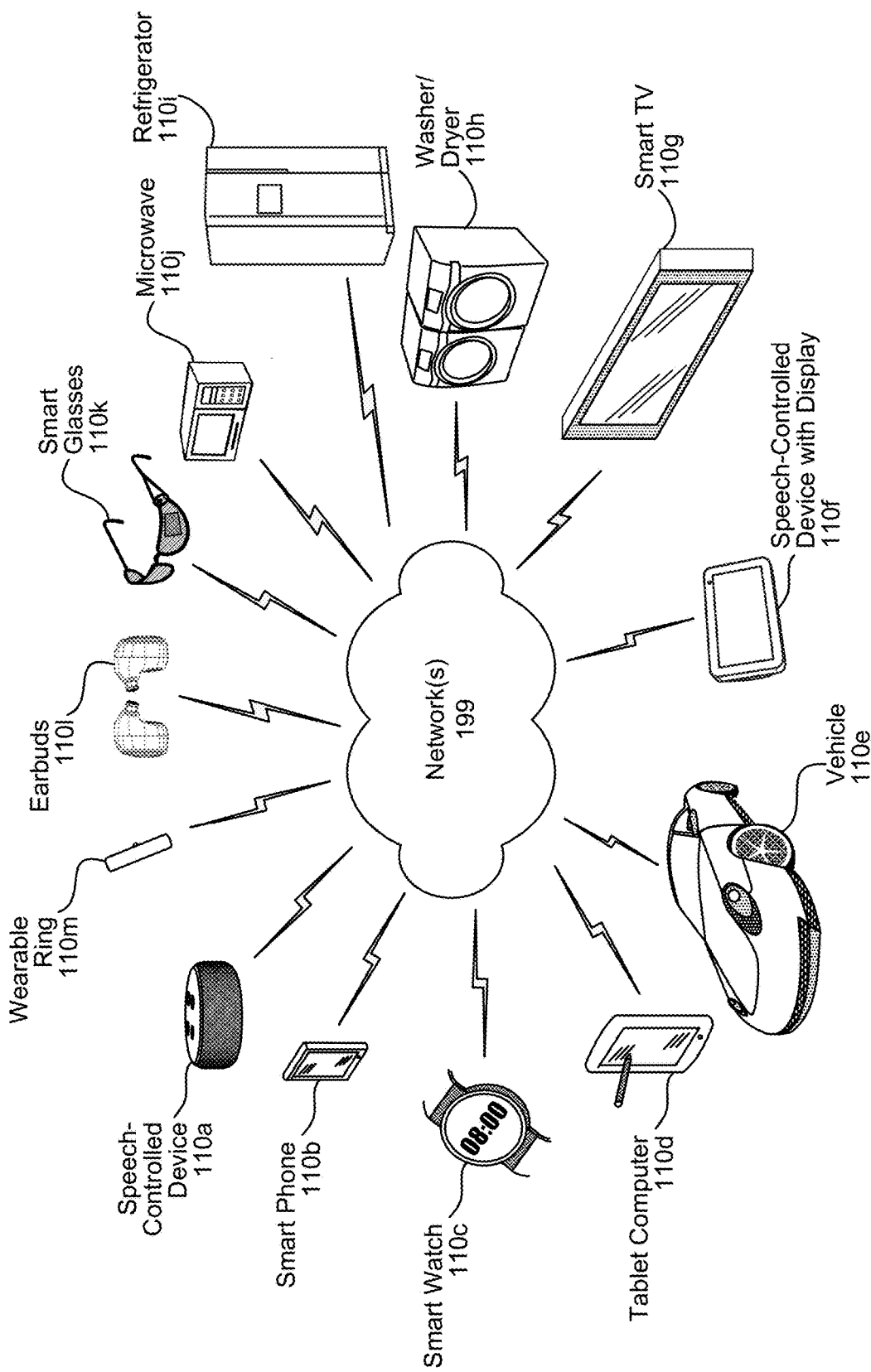

US 11,798,538 B1

ANSWER PREDICTION IN A SPEECH PROCESSING SYSTEM

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A is a block diagram illustrating answer prediction components of the system, according to embodiments of the present disclosure.

FIG. 1B is a conceptual diagram illustrating a system configured for predicting answers in a speech processing system, according to embodiments of the present disclosure.

FIGS. 3A-3B illustrate example component diagrams of a media transport system configured to perform media processing according to embodiments of the present disclosure.

FIG. 16 illustrates an example of a computer network for use with the overall system, according to embodiments of the present disclosure.

DETAILED DESCRIPTION

Figure 2:
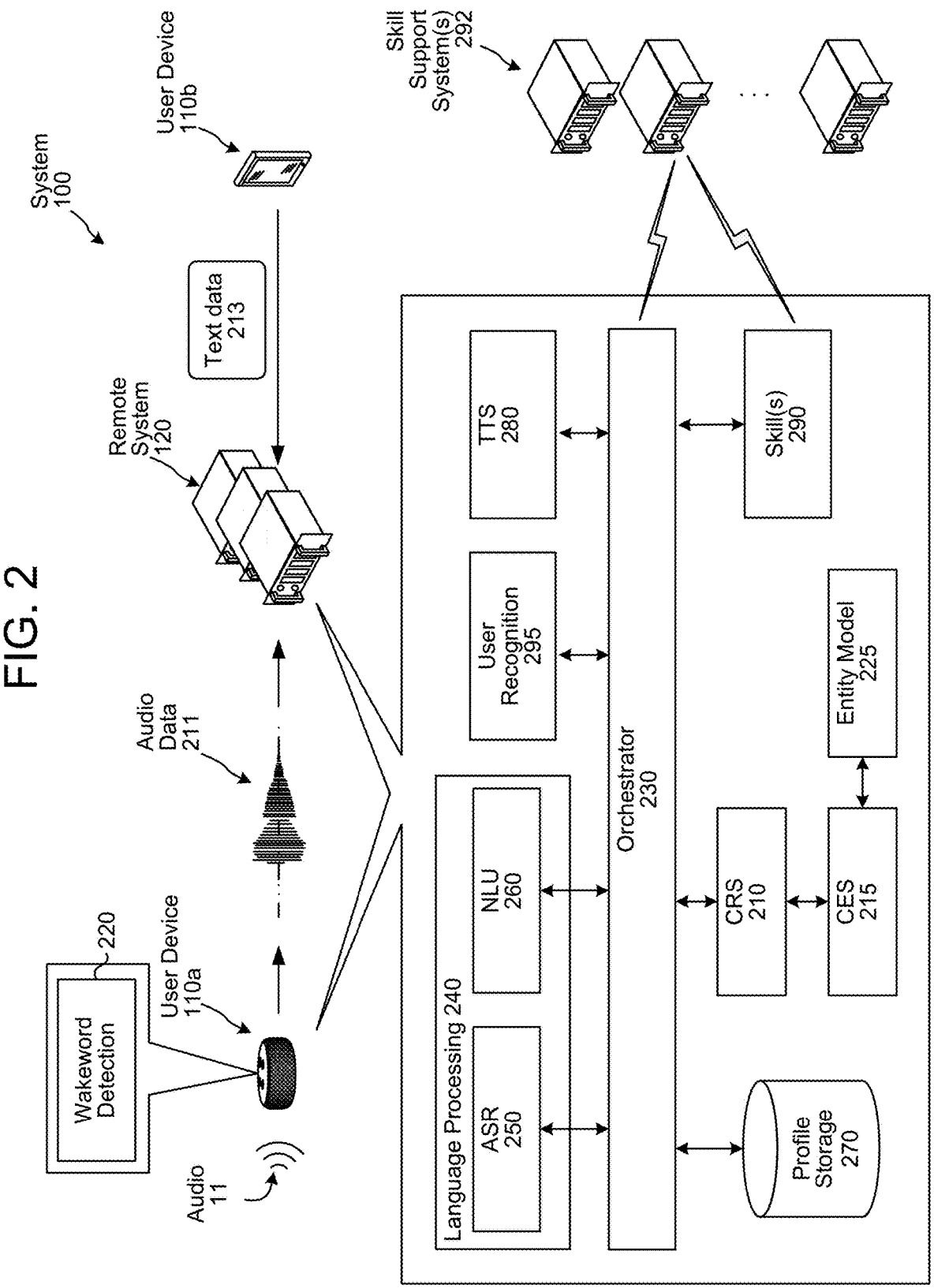
FIG. 2 is a block diagram illustrating language processing components of the system, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of computer science concerning transforming textual and/or other data into audio data that is synthesized to resemble human speech. ASR, NLU, and TTS may be used together as part of a speech-processing system.

A system may be configured to perform actions and/or output other types of responses responsive to user inputs (e.g., spoken inputs and/or typed inputs). For example, a system may be configured to output weather information in response to a user input including "Alexa, what is the weather." As a further example, a system may be configured to adjust settings in a smart home environment in response to a user input including "Alexa, dim the living room lights." The system may be further configured to perform an action, such as lowering a window of an automobile, in response to a user including "Alexa, roll down my window."

A device may be configured to receive a spoken user input, detect a wakeword (which may include one or more words, e.g., "Alexa," "hey Siri," "OK Google," etc.) in the user input, determine a command or other type of request in the user input, and perform an action and/or otherwise respond to detecting the wakeword and/or determining the request. For example, in response to the device detecting the wakeword, the device may send audio data, representing the user input, to a system for processing (e.g., speech processing).

A user may use the device to perform different actions that involve other parties; for example, voice and/or video calls, messaging, emails, etc. When the user requests, by voice or otherwise, the device to initiate an action, the user may reference one or more entities corresponding to a parameter of the action; for example, the target (e.g., a contact, recipient, location, etc.). For example, an utterance of "Alexa, call John" includes a request to initiate an action ("call") and a parameter of the action ("John"). In some cases, however, the target may be ambiguous, such as when several contacts share a part of a name, or implied, such as when the user identifies the target by relationship or nickname. Certain actions such as those involving communications, may involve additional parameters such as source and/or network (e.g., a particular communication system such as voice over internet protocol (VOIP), short message service (SMS), Skype, Drop In, etc.) that may or may not have been indicated by the user request. To initiate the action, the system may need to determine, confirm, or disambiguate the parameters. The system may do so by prompting the user with follow-up questions. For example, if the user says "Call John," the system may ask which contact named John the user wishes to call. The system may further ask who is placing the call, and whether the user wishes to call John via cell phone, Alexa, etc. The follow-up questions may serve multiple purposes. First, they can be used to get information to ensure the system initiates the intended action in the intended manner. And second, they can enable a layer of security and privacy by preventing the system from, for example, initiating an unwanted communication. Asking the user too many questions, however, may frustrate the user and result in a poor user experience.

This disclosure therefore relates to systems and methods for disambiguating entities spoken or implied in requests to initiate actions. To initiate an action, a system may receive or determine one or more parameters; for example, a target (i.e., the contact/recipient), a source (i.e., the caller/user), and a network (voice over internet protocol (VOIP), cellular, video chat, etc.). Due to the privacy implications of initiating an action, such as opening video and/or communication between two parties, the system may apply a high threshold for a confidence associated with each parameter. Rather than ask multiple follow-up questions, however, the proposed system may attempt to disambiguate or determine one or more parameters, and skip certain questions if it can predict an answer with high confidence. The system may predict answers using a combination of ASR/NLU, a user-specific entity library, and processing user-specific historical data regarding past communications using one or more models. The system can improve the customer experience while maintaining security for actions involving communication sessions (phone, email, messaging), transactions (purchases, sales), and/or A system according to the present disclosure may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A is a block diagram illustrating the answer prediction components of the system 100, according to embodiments of the present disclosure. The system 100 can perform, for example, operations as shown in FIG. 1B and explained further below with regard to FIG. 1A. FIG. 1B is a conceptual diagram illustrating a system 100 configured for predicting answers in a speech processing system, according to embodiments of the present disclosure. As shown in FIG. 1B, the system 100 may include a user device 110 (local to a user 5) and one or more remote systems 120 connected across one or more networks 199. While the user 5 is illustrated as being a human, other types of users (e.g., computing systems) may exist. The device 110 may be capable of receiving audio and/or video input, and providing audio and/or video output. The device 110 may be capable of communicating with one or more other, devices 110 using a media transport/communications system 102, described in greater detail below with regard to FIGS. 3A-3D. The device may be a voice-enabled device. The device 110 may receive audio corresponding to a spoken natural language input originating from the user 5. The device 110 may record audio following detection of a wakeword. The device 110 may generate audio data corresponding to the audio, and may send the audio data to the remote system 120. The device 110 may send the audio data to the remote system 120 via an application that is installed on the device 110 and associated with the remote system 120. An example of such an application is the Amazon Alexa application that may be installed on a smart phone, tablet, or the like. In some implementations, the device 110 may receive text data corresponding to a natural language input originating from the user 5, and send the text data to the remote system 120. The device 110 may also receive output data from the remote system 120, and generate a spoken-word audio output. Examples of various devices 110 are further illustrated in FIG. 16.

The following describes example operations for answer prediction in a speech processing system. The system 100 may receive input data (180). The system 100 may perform natural language understanding (NLU) processing on the first input data to determine first NLU data including an intent to initiate an action with respect to a target contact (182). The system 100 may perform entity resolution (ER) on the first NLU data to determine first entity resolution data including at least a first target contact candidate and a second target contact candidate (184). The system 100 may determine that the first entity resolution data includes at least two target contact candidates (186). The system 100 may, in response to the first entity resolution data includes at least two target contact candidate, determine, using the first entity resolution data and first historical data representing prior actions, second entity resolution data associated with at least the first target contact candidate (188). The system 100 may initiate, based on the second entity resolution data, a first action with respect to the first target contact candidate without outputting a request to disambiguate the first target contact candidate and the second target contact candidate (190).

The system 100 may receive input data (180). The input data can represent, for example, a command inputted by the user 5 to the device 110. Having received the command, the device 110 may transmit data representing the input data to the remote system 120. For example, if the command is spoken, the device 110 may transmit audio data representing the input data to the remote system 120. In other cases, the device 110 may transmit text data representing the input data to the remote system 120.

The system 100 may perform natural language understanding (NLU) processing on the input data to determine NLU data including an intent to initiate an action with respect to a target contact (182). If the input data is in the form of spoken language, the system 100 may additionally perform automatic speech recognition (ASR) processing on the input data to generate ASR data, and the system 100 may perform NLU processing on the ASR data. ASR and NLU are discussed in additional detail below with reference to FIGS. 8 through 11. The intent to initiate the action may include an indication of an action executed between parties over a particular network; for example, a communication session (e.g., over a particular communication system such as VOIP, SMS, Skype, Drop In, cellular phone, email, instant messaging, etc.), a transaction (e.g., a purchase using a website or an app), and/or a money transfer. Based on the intent, the system 100 may identify a skill component 290 for executing the action.

The system 100 may perform entity resolution on the first NLU data to determine entity resolution data including at least a first target contact candidate and second target contact candidate (184). The requested action may have certain parameters specifying how the action is to be executed. For example, in the context of a communication session, the parameters can include a target (e.g., a contact/recipient), a source (e.g., a caller/requesting user), and a network (voice over internet protocol (VOIP), cellular, video chat, etc.). For other action types, the parameters may be similar or analogous, such as a target location for navigation, a recipient for transfer funds, an app for performing a requested purchase, etc. The target for the action may be an entity either explicitly included in the input data or implied by the input data. The system 100 may perform entity resolution to identify the entity and, by extension, determine the target. The entity resolution data may include one or more target contact candidates from, for example, a contact list associated with the user 5, a user profile, and/or the device 110. In some implementations, a contact list may be associated with user profile. The system 100 may identify a particular user profile based on a device identifier or a user identifier received from the device 110 and/or based on user recognition data generated as descried below with reference to FIGS. 12 and 13. A target contact candidate may relate to a contact in the contact list. In some cases, the entity resolution data may include more than one target contact candidate. In some implementations, a target contact candidate may be associated with a score representing a probability that the target contact candidate is the correct target contact. In some implementations, the scores may be binned into high, medium, and low bins (or any other appropriate binning scheme). If no target contact candidates have a clear highest score, or if two or more target contact candidates have scores falling in the high bin, then the system 100 may determine that the entity resolution data is potentially ambiguous.

The system 100 may determine that the first entity resolution data includes at least two target contact candidates (186). The system 100 may output the entity resolution data to a skill component associated with the intended action. The skill component may have heightened thresholds for entity candidate confidence or other criteria to satisfy before executing an action with privacy and/or security implications. The skill component may determine that the entity resolution data includes the at least two target candidates that may meet criteria for initiating an action. For example, the target contact candidates may be associated with respective scores such as confidence values indicating a confidence that the candidate is the intended target. In some cases, entity resolution may return multiple candidate entities identified for the input data with none having a clear highest score. For example, the system 100 may bin the scores into high, medium, and low bins. The skill component may determine based on the score or scores that more than one candidate shares a high score, that more than one candidate has a score in the high bin, that a difference between the two highest scores is below a threshold, that no candidate has a score high enough to satisfy a condition (e.g., that no scores fall into the high bin), etc. The second entity data may thus be potentially ambiguous. To perform the requested action correctly and securely, the skill component may need to disambiguate the entity resolution data. To avoid frustrating the user 5 with follow-up questions, the skill component may attempt to disambiguate the entity resolution data using additional entity resolution features of the system 100, such as the connection resolution component (CRC), connection experience component (CEC), and one or more entity models as described further below. The additional entity resolution features may leverage historical data regarding previous actions to disambiguate the entity resolution data.

The system 100 may, in response to the first entity resolution data includes at least two target contact candidate, determine, using the first entity resolution data and first historical data representing prior actions, second entity resolution data associated with the first target contact candidate (188). The system 100 may undertake a secondary entity resolution process using the CRC, CEC, and entity models to re-rank and/or prune the first entity resolution data. The system 100 may thus determine second entity resolution data. The system 100 may determine the second entity resolution data using, for example, historical data stored in an action log. The system 100 may process the historical data to determine one or more features associated with a target contact candidate, for example and without limitation, a number of previous actions targeting the same target contact candidate, a frequency of actions targeting the target contact candidate, a relationship (e.g., friend/family) of the target to an identified user 5, recent actions targeting the target contact candidate, etc.

In some implementations, the second entity resolution data may include a third score (e.g., an updated confidence value) for the first target contact candidate. The system 100 may determine that the third score satisfies a condition. For example, the system 100 may determine that the third score associated with the first target contact candidate exceeds a threshold, that the third score is the only score in the high bin, and/or that the third score is different enough from a next-highest score corresponding to the second target contact candidate.

The system 100 may initiate, based on the second entity resolution data, a first action with respect to the first target contact candidate without outputting a request to disambiguate the first target contact candidate and the second target contact candidate (190). If the system 100 determines that the secondary entity resolution process has identified a top-ranked target contact candidate (e.g., a target contact candidate having a confidence meeting one or more conditions), the system 100 may initiate the action accordingly by; for example, initiating a communication session to the target contact candidate. The system 100 may disambiguate one or more additional parameters (e.g., a source or network) of the action using a similar process. The configuration of the CRC, CEC, and entity models is described in additional detail below with reference to FIG. 1A, and example operations of the CRC, CEC, and entity models are described below with reference to FIGS. 4 through 7.

In some implementations, the system 100 may perform a similar process to disambiguate an entity implied by reference to a previous event. For example, the user 5 may input a request such as "Did John email me today?" Thus the system 100 may receive second input data, and performing NLU processing on the second input data to determine second NLU data including third entity resolution data. The system 100 may determine based on the second NLU data that the input data relates to a request for information regarding a first entity, e.g., "John," associated with a previous event. The system 100 may process the third entity resolution data and the first historical data to determine fourth entity resolution data including a fourth score associated with a first entity candidate; e.g., "John Dennis." The system 100 may determine based at least on the fourth score that the first entity candidate represents the first entity. The system 100 may process the request for information using the first entity candidate to answer the question of whether the system 100 observed any email from John Dennis during the previous twenty-four hours.

FIG. 2 is a conceptual diagram of components of the remote system 120, according to embodiments of the present disclosure. The system 100 may operate using various components as illustrated in FIG. 2. The various components may be located on a same or different physical devices. For example, functions of a language processing component 240 may be split between multiple remote systems 120, or between the remote system 120 and the user device 110a. The user device 110a may have natural language processing capabilities of its own, such as ASR and/or NLU components similar to those of the language processing component 240. Whether natural language processing is performed on the user device 110a, the remote system 120, or split between the user device 110a and remote system 120 in a hybrid configuration, the operations discussed below remain the same. Communication between various components may occur directly or across a network(s) 199.

An audio capture component(s), such as a microphone or array of microphones of a user device 110a, captures audio 11. The user device 110a processes audio data, representing the audio 11, to determine whether speech is detected. The user device 110a may use various techniques to determine whether audio data includes speech. In some examples, the user device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110a may implement a limited classifier configured to distinguish speech from background noise. The classifier may be implemented by techniques such as linear classifiers, support vector machines, and decision trees. In still other examples, the user device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the user device 110a may use a wakeword detection component 220 to perform wakeword detection to determine when the user 5 intends to speak an input to the remote system 120. The user device 110a may be configured to detect various wakewords. In at least some examples, each wakeword may correspond to a different digital assistant. In at least some examples, a wakeword may correspond to a name of a digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without MINI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the user device 110a may "wake" and begin transmitting audio data 211, representing the audio 11, to the remote system 120. The audio data 211 may include data corresponding to the detected wakeword, or the user device 110a may remove the portion of the audio corresponding to the detected wakeword prior to sending the audio data 211 to the remote system 120.

The remote system 120 may include an orchestrator component 230 configured to receive the audio data 211 from the user device 110a and relay data to and from the various components of the remote system 120. The remote system 120 may include a language processing component 240 configured to perform language processing. As used herein, language processing may refer to NLU processing, or a combination of ASR processing and NLU processing.

The orchestrator component 230 may send the audio data 211 to an ASR component 250 that transcribes the audio data 211 into ASR results data including one or more ASR hypotheses. ASR results data may include one or more textual interpretations (corresponding to one or more ASR hypotheses), or may be configured in another manner, such as a token. Each ASR hypothesis may represent a different likely interpretation of the speech in the audio data 211. Each ASR hypothesis may be associated with a score representing a confidence of ASR processing performed to generate the ASR hypothesis with which the score is associated.

In addition to a user device 110a receiving a spoken natural language input, a user device 110b may receive a typed natural language input. The user device 110b may generate text data 213 representing the typed natural language input, and may send the text data 213 to the remote system 120, wherein the text data 213 is received by the orchestrator component 230.

Figure 10:
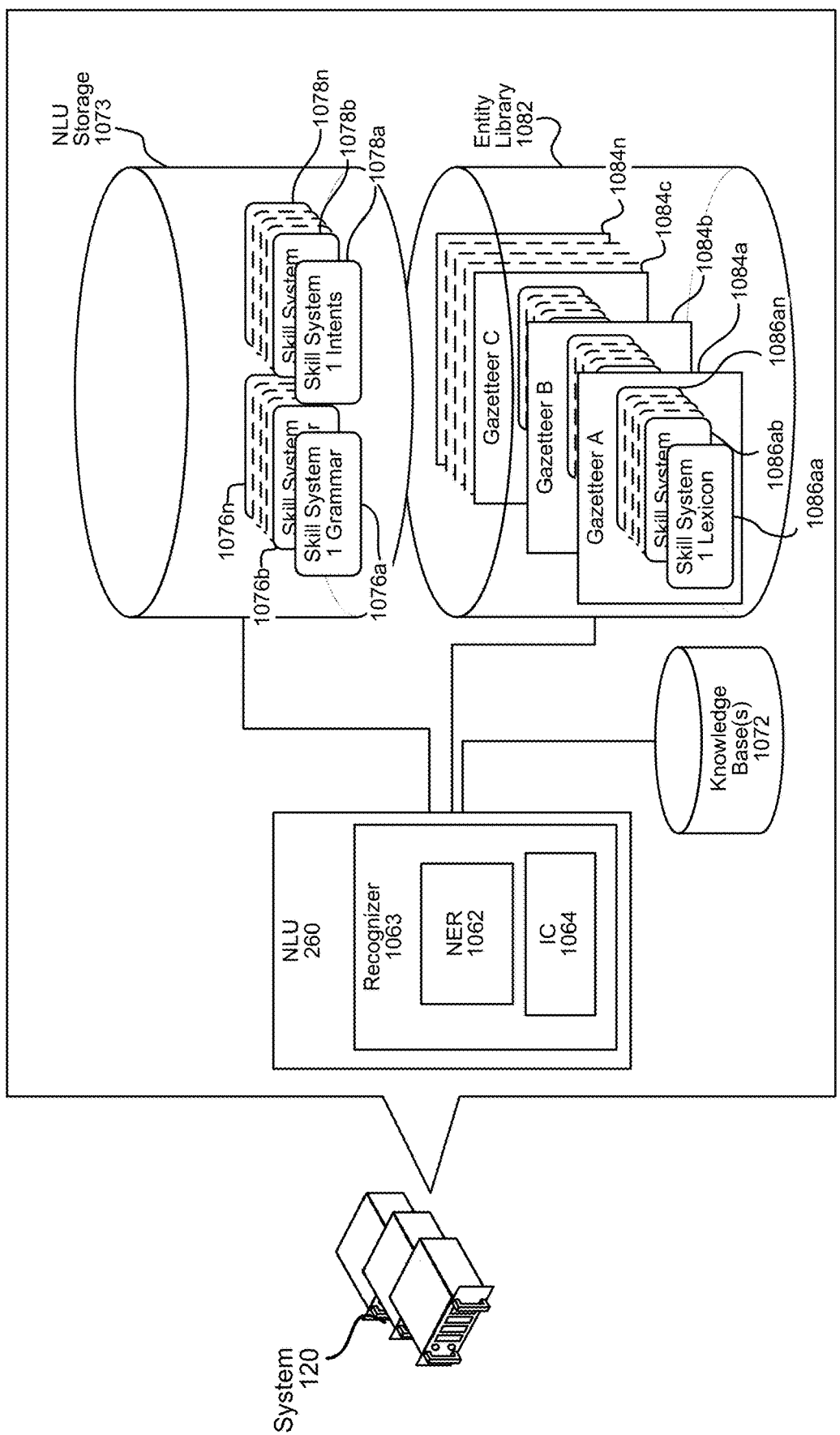
FIG. 10 is a conceptual diagram of how natural language processing is performed, according to embodiments of the present disclosure.
Figure 11:
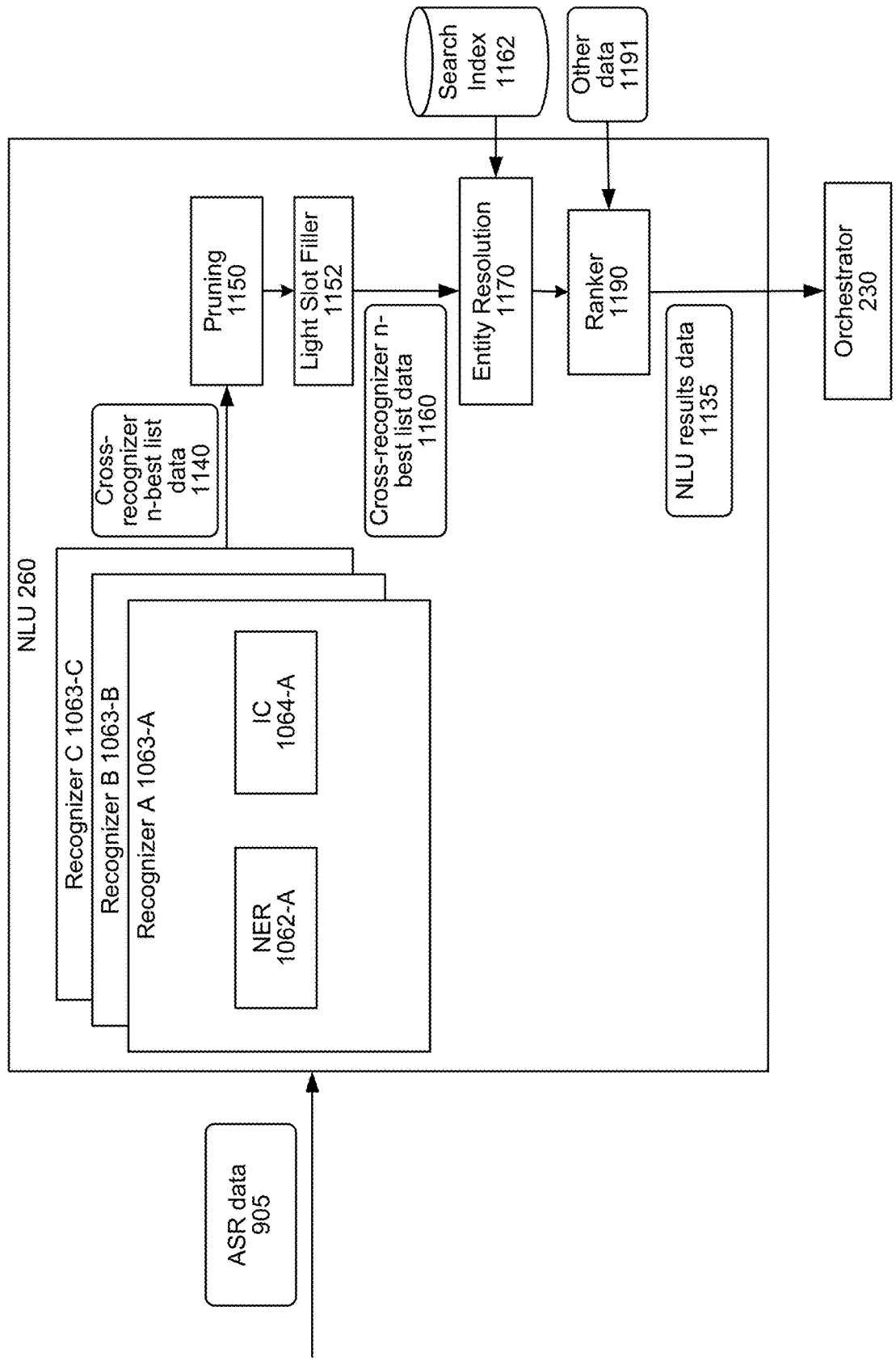
FIG. 11 is a conceptual diagram of how natural language processing is performed, according to embodiments of the present disclosure.

The orchestrator component 230 may send the text data 213 or ASR results data output by the ASR component 250, depending on the type of natural language input, to a NLU component 260. FIGS. 10 and 11, described further below, illustrates how the NLU component 260 may perform NLU processing.

The remote system 120 may include or otherwise communicate with one or more skill components 290 and/or skill support systems 292. A skill component 290 may be configured to execute with respect to NLU results data 1135. For example, for NLU results data 1135 including a <GetWeather> intent, the remote system 120 (and more particularly the orchestrator component 230) may invoke a weather skill component 290 to determine and output weather information for a geographic location represented in a user profile or corresponding to a location of the user device 110 that captured the corresponding natural language input. For further example, for NLU results data including a <BookRide> intent, the remote system 120 (and more particularly the orchestrator component 230) may invoke a taxi skill component 290 may book a requested ride. In another example, for NLU results data including a <BuyPizza> intent, the remote system 120 (and more particularly the orchestrator component 230) may invoke a restaurant skill component 290 may place an order for a pizza. A skill component 290 may operate in conjunction between the remote system 120 and other devices, such as the user device 110, restaurant electronic ordering systems, taxi electronic booking systems, etc. in order to complete certain functions. Inputs to a skill component 290 may come from speech processing interactions or through other interactions or input sources. A skill may be implemented as a skill component 290 and/or a skill support system 292 separate from the remote system 120. A skill component 290 may be associated with a domain, a non-limiting list of which includes a smart home domain, a music domain, a video domain, a weather domain, a communications domain, a flash briefing domain, a shopping domain, and a custom domain.

The remote system 120 may include a connection resolution component (CRC) 210, a connections experience component (CEC) 215, and one or more entity models 225. A component of the remote system 120—for example, a skill component 290 and/or skill support system 292—may query the CRC 210 to disambiguate, confirm, or otherwise identify an entity present or implied in a request received via the device 110. The CRC 210 may resolve entities based on a ranking of entities outputted by the CEC 215. The CEC 215 may list and/or rank entities based on historical data for the requesting user. The CEC 215 may refer to the one or more entity models 225 to process the historical data. Operations of the CRC 210, CEC 215, and entity models are described in further detail below with reference to FIGS. 3 through 7.

The remote system 120 may include a TTS component 280 that generates audio data (e.g., synthesized speech) from text data using one or more different methods. Text data input to the TTS component 280 may come from a skill component 290, the orchestrator component 230, or another component of the remote system 120. The TTS component 280 may be used, for example, to generate a spoken output with a request for the user 5 to disambiguate, confirm, or otherwise identify an entity or other parameter of an action. For example, if the user 5 says, "Call Bob," the system 100 may use the TTS component 280 to output a prompt "Would you like to call Bob Alan?", to which the user 5 may reply "Yes." In another example, the system may output, "Would you like to call Bob Alan or Bob Ballard?", to which the user may reply, "Bob Ballard." The remote system 120 may process the reply and execute a corresponding action accordingly.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The remote system 120 may include a user recognition component 295. The user recognition component 295 may analyze data received by and/or stored in the remote system 120 to generate user recognition data. The remote system 120 may use the user recognition data to aid in determining one or more parameters of an action. For example, the remote system 120 can use the user recognition data to identify a user for the purpose of retrieving user-specific data—for example, from an entity library such as a contact list, or from an action log—to disambiguate, confirm, or otherwise identify entities as parameters of a requested action. The remote system 120 may also use the user recognition data to identify a source of an action; e.g., as the user requesting the action. In at least some examples, the user recognition component 295 may be implemented as a skill component 290.

The user recognition component 295 may recognize one or more users using various data. The user recognition component 295 may take as input the audio data 211 and/or the text data 213. The user recognition component 295 may perform user recognition processing by comparing speech characteristics, in the audio data 211, to stored speech characteristics of users. The user recognition component 295 may additionally or alternatively perform user recognition processing by comparing biometric data (e.g., fingerprint data, iris data, retina data, etc.), received by the remote system 120 in correlation with a current natural language input, to stored biometric data of users. The user recognition component 295 may additionally or alternatively perform user recognition processing by comparing image data (e.g., including a representation of at least a feature of the user 5), received by the remote system 120 in correlation with a current natural language input, with stored image data including representations of features of different users of the user device 110. The user recognition component 295 may perform other or additional user recognition processes, including those known in the art. For a particular natural language input, the user recognition component 295 may perform processing with respect to stored data of users associated with the user device 110 that captured the natural language input.

The user recognition component 295 determines whether a natural language input originated from a particular user. For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition processing.

Figure 12:
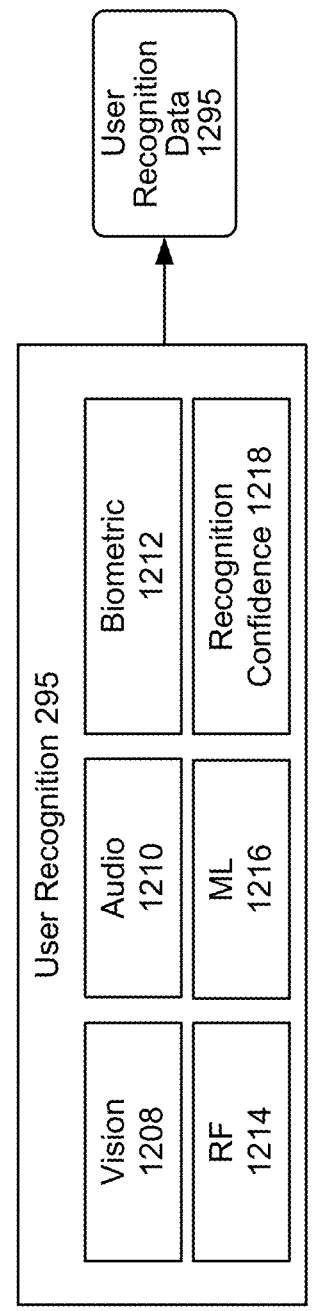
FIG. 12 is a schematic diagram of an illustrative architecture in which sensor data is combined to recognize one or more users according to embodiments of the present disclosure.
Figure 13:
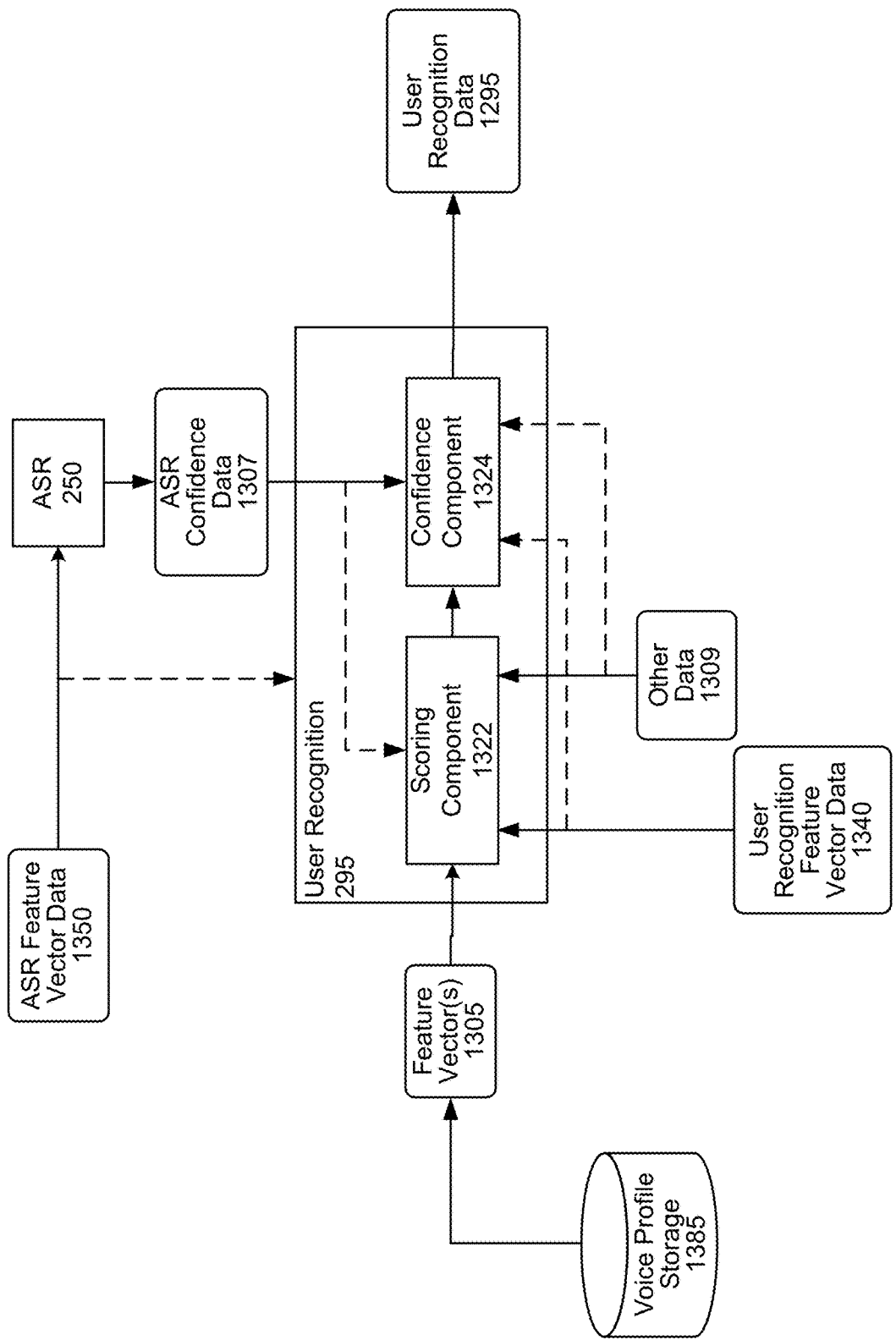
FIG. 13 is a system flow diagram illustrating user recognition according to embodiments of the present disclosure.

The user recognition component 295 may output a single user identifier corresponding to the most likely user that originated the natural language input. Alternatively, the user recognition component 295 may output multiple user identifiers with respective values representing likelihoods of respective users originating the natural language input. The output of the user recognition component 295 may be used to inform NLU processing, processing performed by one or more skill support systems 292, as well as processing performed by other components of the remote system 120 and/or other systems. FIGS. 12 and 13, described further below, illustrates how the user recognition component 295 may determine a user identity.

The remote system 120 may include profile storage 270. The profile storage 270 may include a variety of information related to individual users, groups of users, devices, etc. that interact with the remote system 120. As used herein, a "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information. Data of a profile may additionally or alternatively include information representing a preferred assistant to respond to natural language inputs corresponding to the profile.

The profile storage 270 may include one or more user profiles. Each user profile may be associated with a different user identifier. Each user profile may include various user identifying information. Each user profile may also include preferences of the user. Each user profile may include one or more device identifiers, representing one or more devices registered to the user. Each user profile may include identifiers of skill support systems 292 that the user has enabled. When a user enables a skill component 290, the user is providing the remote system 120 with permission to allow the skill component 290 to execute with respect to the user's natural language inputs. If a user does not enable a skill component 290, the remote system 120 may not invoke the skill component 290 to execute with respect to the user's natural language inputs. The profile storage 270 may additionally store user-specific entity data, such as entity libraries, gazetteers, and/or pointers to the same, for use by the CRC 210 and/or CEC 215 and other components of the remote system 120.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 270 may include one or more device profiles. Each device profile may be associated with a different device identifier. A device profile may include various device identifying information. A device profile may also include one or more user identifiers, corresponding to one or more user profiles associated with the device profile. For example, a household device's profile may include the user identifiers of users of the household.

FIG. 1A is a block diagram illustrating the answer prediction components of the system 100, according to embodiments of the present disclosure. The system 100 includes the device 110, language processing component 240, skill component 290, CRC 210, CEC 215, and entity model 225 previously introduced. The device 110 can receive audio 11 and transmit audio data 211 to the remote system 120. The language processing component 240 can receive the audio data and output NLU results data. The NLU results data may include one or more NLU hypotheses with one or more entities. An NLU hypothesis may include an intent to perform an action between parties; for example and without limitation, initiate a communication session, perform a commercial transaction, execute a data transfer, etc. An intent can correspond to a skill component 290 configured to execute such an action. The orchestrator component 230 can direct the NLU results data from the language processing component 240 to one or more relevant skill components 290 and/or skill support systems 292. The skill component 290 can receive NLU results data from the language processing component 240 via the orchestrator component 230. The skill component 290 can be a speechlet configured to perform the requested action; for example, the skill component 290 may be a call speechlet, messaging speechlet, money transfer speechlet, etc. The skill component 290 may call on the CRC 210 to disambiguate or confirm one or more parameters of the requested action; for example, an entity such as a target or source of the action, a network over which the action is to be executed, etc. The target and/or source may be a user, group, organization, location, device, etc.

The CRC 210 may include an orchestrator 130. The orchestrator 130 may be the same or separate from the orchestrator component 230. The orchestrator 130 may send the NLU results data, or data representing the same, to one or more resolution components including a target resolution component 105, a source resolution component 112, and/or a network resolution component 115. The resolution components can disambiguate, confirm, or otherwise determine parameters used for initiating actions between parties. For example, for an operation such as a voice communication, the system may determine a source (the user/caller), a target (the recipient), and a network (cellular, VOIP, etc.). For security and privacy purposes, the system 100 may ask the user 5 to disambiguate or confirm parameters of the action before initiating the action. For example, the system 100 may output a request for the user 5 to verify the target contact and/or the user's 5 own identity as a safeguard against unintentionally initiating an action. The user 5 may get frustrated, however, if asked too many questions in relation to each requested action. Thus, the system 100 may attempt to predict an answer to one or more questions; and, if the prediction is associated with a high enough confidence, the system 100 may skip the question.

The target resolution component 105 may receive the NLU results data from the orchestrator 130 and attempt to determine a target of the requested action. The target resolution component 105 may run a static set of rules to find a matching contact/device/space to find one or more probable candidates for the target. The static set of rules include, for example and without limitation, trimming low entity resolution results, determining whether public-switch telephone network (PTSN) calling is enabled, filtering out-of-network contacts for communications over a proprietary network (e.g., removing non-Amazon-to-Amazon contacts when handling a request for Amazon's Drop In service), etc. The target resolution component 105 may include or communicate with a connection resource context 106. The connection resource context 106 can include context used for the CRC 210 to process a request. The connection resource context 106 can also serve as a store for multi-turn use cases where one or more related actions are requested by a user over the course of one or more inputs received by the system 100 over a short time period. The other resolution components (e.g., the source resolution component 112 and/or the network resolution component 115) may refer to the connection resource context 106 in a similar manner.

The source resolution component 112 may receive the NLU results data from the orchestrator 130 and attempt to determine a source of the requested action. The source resolution component 112 may run a static set of rules to identify a user, group, device, etc. identities, which can be used to as a parameter for, for example, initiating a communication session. The identities may include, for example, a user who has explicitly identified herself to the device 110, or group members associated with the device 110 who have a contact matching an identified target of the action, etc. The source resolution component 112 may receive user profile information and/or user recognition data 1295 from the user recognition component 295.

The network resolution component 115 may receive the NLU results data from the orchestrator 130 and attempt to determine a network of the requested action. The network resolution component 115 may run a static set of rules to match the probable networks that can be used to perform the requested action. For example, if the user 5 has specified a phone number type in the utterance, the network resolution component 115 may use that information to setup a connection. In another example, if a network is not available on the device 110, the network resolution component 115 may remove that network from a list of network candidates.

The resolution components can call on the connection resolution (CR) entity resolver 150 to resolve one or more of the target, source, and/or network, and the CR entity resolver 150 may return a single high confidence target, source, and/or network. The CR entity resolver 150 can filter entity candidates, and determine whether to assume a highest ranked candidate entity is the intended entity, or whether to request disambiguation or confirmation of a specific entity name. The CR entity resolver 150 includes an action resolver 125 and an entity picker 135.

The entity picker 135 can receive a list of probable candidate entities from the resolution components via the action resolver 125, and call the CEC 215 to get scores, ranks, and/or bins of the candidate entities. (Structure and operation of the CEC 215 are described in additional detail below.) The entity picker 135 may, based on the returned scores, ranks, and/or bins, determine whether any top entity candidate can be used as a predicted response. For example, if the returned entity/entities include an entity candidate with a score above a threshold, the entity picker 135 may set that entity candidate as the predicted response. If the returned entities include several entity candidates, but only one entity candidate in a High bin, the entity picker 135 may set that entity candidate as the predicted response. If the returned entities include more than one entity candidate, but the difference in scores exceeds a threshold, the entity picker 135 may set the entity candidate with the higher score as the predicted response. Various other dynamic and/or static rules may be set for picking an entity.

The action resolver 125 may receive the entity candidates from the resolution components and pass them to the entity picker 135. The action resolver 125 can receive the scores, ranks, and/or bins of the entity candidates from the entity picker 135. If the entity picker 135 sets a predicted response, the action resolver 125 can return the top entity candidate to the appropriate resolution component (e.g., the target resolution component 105, the source resolution component 112, and/or the network resolution component 115). The resolution component may pass entity resolution output data including the predicted response back to the orchestrator 130, which passes it on to the skill component 290. The skill component 290 may initiate the requested action based on the entity specified by the predicted response. The orchestrator 130 may additionally send the entity resolution output data to an action log 145 of the CEC 215 for recording. The data sent to the action log 145 may include information regarding context of the action request for use in filtering data retrieved from the action log 145, as is described further below.

If the entity picker 135 does not set a predicted response, the action resolver 125 can sent a request for disambiguation and/or confirmation to an action handler 122. The action handler 122 may send a prompt for disambiguation and/or confirmation to the device 110 via the TTS component 280. The TTS component 280 may convert the prompt into a spoken language output. The device 110 may receive an audio input following the prompt. The device 110 may send audio data to the language processing component 240. The language processing component 240 may send NLU results data including entity resolution results to the orchestrator 130. The orchestrator 130 may pass the NLU results data to the relevant resolution component (e.g., the target resolution component 105, the source resolution component 112, and/or the network resolution component 115). Based on the NLU results data, the resolution component can resolve the entity, and output the entity name to the skill component 290 via the orchestrator 130. The skill component 290 may initiate the action based on the entity specified by resolution component.

The CEC 215 can receive a list of probable candidate entities from the entity picker 135 and return scores, ranks, and/or bins of the candidate entities. The CEC 215 may include an entity ranker 140, an action log 145, and one or more feature components (FCs). A FC can calculate feature values based on data stored in the action log 145. For example, a FC can include logic and/or software configured to sue the data to determine a feature value. The entity ranker 140 can collect one or more feature values to generate a feature vector. The entity ranker 140 can send the feature vector to the entity model 225, which can return a score based on the feature vector. The FCs may include one or more of a memory FC 175, a frequency FC 155, a friends and family FC 160, a recent FC 165, and/or other FCs 170.

The entity ranker 140 can take the list of entity candidates and compute a score for each entity candidate based on features extracted from the action log 145 via the one or more FCs. The entity ranker 140 can send the extracted features to the entity model 225 to get one or more scores for each. In some implementations, the entity model 225 will return one score on a scale of 0-1 for an entity candidate. In some implementations, the entity model 225 may return scores in a different format and/or on a different scale.

The CEC 215 has an extensible architecture that may include one or more feature extractors in the form of FCs, depending on the implementation. In this manner, the CEC 215 may be improved or otherwise modified when provided with new and/or alternate features. Each FC can provide features in a different format and/or scale. For example, the memory FC 155175 may output a Boolean response (e.g., a 0 or a 1) while the frequency FC 155 may output values on a scale of 1-100. Other scales and/or ranges are possible.

The memory FC 175 may determine a memory feature of an entity candidate based on the existence of a previous appearance of that entity candidate in the action log 145 along with a record of a user selection (or confirmed predicted selection) of that entity candidate. In some implementations, the memory FC 175 may further filter previous appearances of the entity candidate in the action log 145 based on matching a current context. For example: If the same user 5 has chosen "Bob Alan" as the target when prompted to disambiguate between "Bob Alan," "Bob Ballard," and "Bob Chris," then the memory FC 175 may assign "Bob Alan" a feature of 1, and the remaining candidates a feature of 0.

The frequency FC 155 may determine a frequency feature of an entity candidate based on a number of appearances of that entity candidate in the action log 145 over a given time frame. The time frame can be a week, a month, a year, since the beginning of records for the user 5, or any other appropriate value. For example, if the user has selected "Bob Alan" five times and "Bob Ballard" once over a given time period, the frequency FC 155 may return a higher value for Bob Alan. In some implementations, the frequency FC 155 may filter appearances of the entity candidate in the action log 145 based on matching a current context.

The recent FC 165 may determine which of a list of entity candidates was the most recently selected based on the records stored in the action log 145. For example, if the user 5 selected "Bob Alan" two weeks ago and selected "Bob Chris" eight days ago, the recent FC 165 may return "Bob Chris" with a higher score than "Bob Alan."

The action log 145 may support features depending on the user's 5 past usage. The action log 145 may receive entity resolution output data from the CRC 210 when the CRC 210 provides the entity resolution output data back to the skill component 290. The action log 145 may log the entity resolution output data once it has been confirmed by the user either by explicit verbal confirmation or by the skill component 290 completing the action without cancelation. The data logged for a target resolution may include a contact name slot value, ER results of various catalogs, entity identifiers of the candidates, a user-chosen value, a catalogue identifier, etc. The data logged for an identity (source) resolution may include a user profile (not necessarily with high confidence), source candidates (e.g., identifiers of home group members or members with access to the device 110), and/or a user-chosen identity. In some implementations, the prompts rendered to a user 5 can also help in predicting the churn for the user 5. For example, in cases where the user 5 is unable to place a call whenever a prompt is rendered, the system 100 can render a different prompt or assume an entity. This approach may be appropriate for resolving the source or network. The action log 145 may also record when a user 5 denies a proposed entity in favor of providing the entity explicitly. This may allow the system 100 to learn when to provide a user 5 an option to choose an intended entity rather than automatically predicting it. In some implementations, the action log 145 may provide other features based on user 5-specific activity; for example, redial and/or speed dial features. The action log 145 may store other action-related events; for example, the action log 145 can receive data from the action handler 122 regarding the output of user prompts (e.g., for entity disambiguation), entity resolution output from the orchestrator 130, and/or data from the skill component 290 regarding canceled or otherwise modified actions, etc.

Other FCs may provide features not necessarily based on previous actions stored in the action log 145. For example, the friends/family FC 160 may use information from the user's 5 contact list to determine relationships between the user 5 and contacts in the contact list. The friends/family FC 160 may aid in initiating actions based on relationship-based entity naming; for example, "Call mom," or "Send a message to my brother." The friends/family FC 160 may also be able to return features related to entity nicknames to, for example, resolve an entity based on a request to "Call Scooter," or "Message Big Jim."

The entity ranker 140 may collect the feature scores for each entity candidate from the FCs and provide the features scores to the entity model 225. The entity ranker 140 may provide the feature scores to the entity model 225 in the form of a vector associated with an entity candidate. The entity model 225 may calculate an overall score for each entity candidate and return the scores to the entity ranker 140. In some implementations, the entity model 225 may be a combined model for processing scores related to entities and actions of different types. In some implementations, the entity model 225 may include different models for scoring different entity and/or action types. For example, a connections model may resolve entities related to voice calls. The connections model may in turn include multiple models for different entity types. The connections model may include a contacts model for computing scores of entity candidates of type contact (e.g., individuals and/or organizations listed in a contact list). The connections model may include a network model for computing scores of entity candidates of type network (e.g., communications systems such as VOIP, cellular phone, Drop In, Skype, etc.). Each model may be trained independently and used for its respective action/entity type. The contacts model can be trained in the first instance with features from the feature extractor FCs and labels for the entities as per user selection. The contacts model may facilitate predicting weights of each feature. The entity model 225 can use these weights at runtime to predict a user-intended entity, and/or assign a score to each entity candidate. Table 1 below shows sample data that may be used to train a contacts model in the entity model 225:

TABLE 1

Sample data for training a contacts model

| Memory | Recent | Frequency | Family | ER query | Label (User chosen) |
|---|---|---|---|---|---|
| 1 | 10 | 5 | 1 | 5 | 1 |
| 0 | 120 | 1 | 5 | 4 | 0 |
| 0 | 720 | 3 | 3 | 2 | 0 |

Figure 3B:
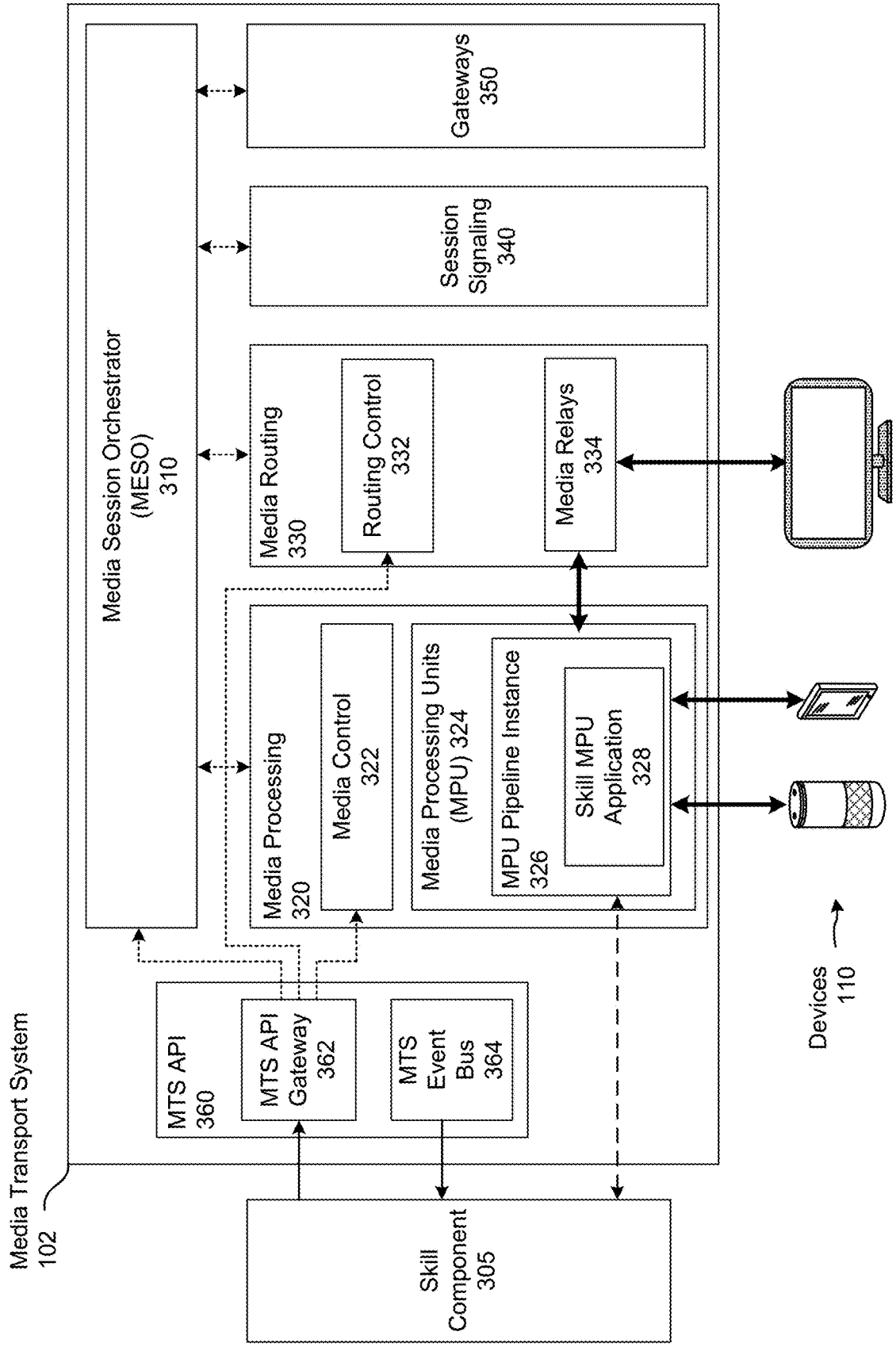

FIGS. 3A-3B illustrate example component diagrams of a media transport system configured to perform media processing according to embodiments of the present disclosure. The media transport system can serve, for example, as a communication system for the purpose of executing certain actions as described herein. As illustrated in FIG. 3A, a skill component 305 (e.g., specific skill configured to support communication sessions on the device 110) may interact with a media transport system 102 to request and utilize resources available within the media transport system 102. For example, the skill component 305 may correspond to an application (e.g., process, skill, and/or the like) running on a local device (e.g., device 110) and/or one or more servers, and the skill component 305 may enable a user 5 to interact with the media transport system 102 to initiate and manage a communication session involving media processing, although the disclosure is not limited thereto. To illustrate an example, the user 5 may input a command to an application programming interface (API) for the skill component 305 that is running on the device 110. The device 110 may send a request corresponding to the command to the one or more servers associated with the skill component 305 and the one or more servers may send the request to the media transport system 102.

In some examples, the skill component 305 may be developed (e.g., programmed) by an internal client or other development team (e.g., developer, programmer, and/or the like) to perform specific functionality. Thus, the skill component 305 may be designed to utilize specific resources available within the media transport system 102 and a finished product is made available to the public (e.g., end-user such as user 5). For example, the skill component 305 may enable the user 5 to initiate and/or participate in a communication session (e.g., group conference call, such as videoconferencing), to consume media content (e.g., streaming video data) with unique functionality or processing, and/or perform additional functionality (e.g., perform computer vision processing on image data, speech processing on audio data, machine learning, and/or the like) without departing from the disclosure. In this example, the media transport system 102 provides a simplified interface that enables the internal client to utilize resources within the skill component 305, but the interface and/or resources are not visible to and/or customizable by the end-user that uses the skill component 305.

The disclosure is not limited thereto, however, and in other examples the skill component 305 may be made available for external development to third party clients and/or to individual users. Thus, the media transport system 102 may provide a simplified interface for unique programming without technical expertise. For example, an individual user 5 may customize the skill component 305 using a drag and drop graphical user interface (GUI) to enable unique functionality, enabling the user 5 to program custom routines, skills, and/or the like. To illustrate an example, the user 5 may customize the skill component 305 to receive image data generated by an image sensor, process the image data using computer vision, and then perform specific action(s). For example, the skill component 305 may be programmed so that when a device (e.g., doorbell camera) detects motion and captures image data, the skill component 305 processes the image data using facial recognition to detect authorized users (e.g., family members or other invited guests) and either performs a first action (e.g., unlock the front door when an authorized user is detected) or performs a second action (e.g., send a notification to the user 5 including image data representing an unauthorized user). Thus, the interface and/or resources associated with the media transport system 102 may be visible to and/or customizable by the end-user that uses the skill component 305 without departing from the disclosure.

To enable the skill component 305 to request and utilize resources from within the media transport system 102, the media transport system 102 may include a media session orchestrator (MESO) component 310 configured to coordinate (e.g., define, establish, manage, etc.) a communication session (e.g., media session).

As illustrated in FIG. 3A, the MESO component 310 may interface between components that fall within four distinct categories: media processing components 320, media routing components 330, session signaling components 340, and/or gateway components 350.

Media processing components 320 refers to processing media content to enable unique functionality. For example, the media transport system 102 may provide a hosted back-end that performs media processing on individual streams of data, enabling the skill component 305 to define and control how media content is processed by the media transport system 102. The media processing components 320 may correspond to real time processing (e.g., data is processed during run-time, such as while streaming video to a user 5, during a videoconference, and/or the like) or offline processing (e.g., data is processed and stored in a database for future requests, such as during batch processing) without departing from the disclosure.

The media processing components 320 may include at least one media control component 322 and/or at least one media processing unit (MPU) 324 (e.g., first MPU 324a, second MPU 324b, etc.). The media control component 322 may coordinate media processing by sending control data to and/or receiving control data from other components within the media transport system 102. For example, the MESO component 310 may send a request to the media control component 322 to launch a specific application (e.g., skill, process, etc.) to perform media processing and the media control component 322 may send an instruction to a corresponding MPU 324.

The MPU 324 may be configured to perform media processing to enable additional functionality. Thus, the MPU 324 may receive first data and process the first data to generate second data. As part of performing media processing, the MPU 324 may perform speech processing on audio data and/or image data, perform computer vision processing on image data, modify audio data and/or image data, apply visual effects (e.g., overlay or other graphical element(s)) to image data, and/or the like to enable interesting functionality without departing from the disclosure. For example, the MPU 324 may generate subtitles (e.g., text data) corresponding to speech represented in image data, may translate the subtitles to a different language, may perform text-to-speech processing to enable additional functionality (e.g., describing visual cues for someone that is visually impaired, replacing dialog with speech in a different language, etc.), may perform voice recognition to identify voices represented in audio data, may perform facial recognition to detect and/or identify faces represented in image data, may perform object recognition to detect and/or identify objects represented in image data, may add a graphical overlay to image data (e.g., censoring portions of the image data, adding symbols or cartoons to the image data, etc.), may perform other processing to media content (e.g., colorize black and white movies), and/or the like without departing from the disclosure.

In some examples, the media transport system 102 may perform media processing using two or more MPUs 324. For example, the media transport system 102 may perform first media processing using a first MPU 324a and perform second media processing using a second MPU 324b. To illustrate an example, a communication session may correspond to a video chat implementation that includes image data and audio data and the media transport system 102 may perform media processing in parallel. For example, the media transport system 102 may separate the image data and the audio data, performing first media processing on the image data and separately performing second media processing on the audio data, before combining the processed image data and the processed audio data to generate output data. However, the disclosure is not limited thereto, and in other examples the media transport system 102 may perform media processing in series without departing from the disclosure. For example, the media transport system 102 may process first image data using the first MPU 324a (e.g., first media processing) to generate second image data and may process the second image data using the second MPU 324b (e.g., second media processing) to generate output image data. Additionally or alternatively, the media transport system 102 may perform multiple media processing steps using a single MPU 324 (e.g., more complex media processing) without departing from the disclosure.

The media transport system 102 may include media routing components 330 that are configured to route media (e.g., send data packets) to and from the device(s) 110 via the network(s) 199. For example, the media routing components 330 may include one or more routing control components 332, media relay components 334, point of presence selection components 336, geographic selection components 337, and/or capability selection components 338. Examples of media relay components may include a Session Traversal of User Datagram Protocol (UDP) Through Network Address Translators (NATs) system (e.g., STUN system) and/or a Traversal Using relays around NAT (TURN) system, although the disclosure is not limited thereto. While FIG. 3A illustrates the media routing components 330 including the point of presence selection components 336, geographic selection components 337, and/or capability selection components 338 as separate components, this is for ease of illustration and the disclosure is not limited thereto. Instead, a single component may perform point of presence selection, geographic selection, and/or capability selection without departing from the disclosure.

In some examples, the media transport system 102 may separate the MPUs 324 from the network(s) 199 so that the MPUs 324 do not have a publicly accessible internet protocol (IP) address (e.g., cannot route outside of a local network). Thus, the system 100 may use the media relay components 334 to send the first data from a first device to the MPUs 324 and/or the second data (e.g., processed data) generated by the MPUs 324 from the MPUs 324 to a second device. For example, an individual device 110 may be associated with a specific TURN server, such that the system 100 may route data to and from the first device using a first TURN server and route data to and from the second device using a second TURN server.

While the example described above illustrates routing data to and from the media processing components 320, the media routing components 330 may be used to route data separately from the media processing components 320 without departing from the disclosure. For example, the system 100 may route data directly between devices 110 using one or more TURN servers (e.g., TURN system) without departing from the disclosure. Additionally or alternatively, the system 100 may route data using one or more STUN servers (e.g., STUN system), such as when a device 110 has a publicly accessible IP address. In some examples, the system may establish communication sessions using a combination of the STUN system and the TURN system without departing from the disclosure. For example, a communication session may be more easily established/configured using the TURN system, but may benefit from latency improvements using the STUN system. Thus, the system 100 may route data using the STUN system, the TURN system, and/or a combination thereof without departing from the disclosure.

In addition to routing data, the media routing components 330 also perform topology optimization. For example, the media routing components 330 may include geographically distributed media relay components (e.g., TURN/STUN servers) to enable the media transport system 102 to efficiently route the data packets. For example, the media routing components 330 may include a control plane that coordinates between the media relay components to select an optimum route (e.g., data path) to send the data packets.

To illustrate an example, the media routing components 330 may determine a location of parties in a communication session and determine a data path that bypasses a particular country or chokepoint in the data network. In some examples, the media routing components 330 may select an enterprise specific route and only use specific connected links associated with the enterprise. Additionally or alternatively, the routing components 330 may apply machine learning models to further reduce latency by selecting the optimum route using non-geographical parameters (e.g., availability of servers, time of day, previous history, etc.).

While the description of the media relay components 334 refers to the STUN system and/or the TURN system, the disclosure is not limited thereto. Instead, the media routing components 330 may use any alternative systems known to one of skill in the art to route the data packets. For example, the media routing components 330 may use any technique that routes UDP data packets and allows the UDP data packets to traverse the NATs without departing from the disclosure. To illustrate an example, the media routing components 330 may include UDP packet forwarding and relay devices instead of the TURN system without departing from the disclosure.

The media transport system 102 may include session signaling components 340 (e.g., edge signaling, signaling network, etc.) that may be configured to coordinate signal paths (e.g., routing of data packets) and/or a type of data packets sent between the devices 110 and server(s) within the media transport system 102. For example, the session signaling components 340 may enable the devices 110 to coordinate with each other to determine how data packets are sent between the devices 110. In some examples, a signal path may correspond to a routing table that indicates a particular route or network addresses with which to route data between two devices, although the disclosure is not limited thereto. As illustrated in FIG. 3A, the session signaling components 340 may support protocols including Session Initiation Protocol (SIP) 341, Real-Time Communication (RTC) protocol 342 (e.g., WebRTC protocol), Alexa Voice Service (AVS) protocol 343 or other voice user interface protocols, Extensible Messaging and Presence Protocol (XMPP) 344, IP Multimedia Core Network Subsystem (IMS) 345, H.323 standard 346, and/or the like, although the disclosure is not limited thereto.

The media transport system 102 may include gateway components 350 that enable the media transport system 102 to interface with (e.g., send/receive media content or other data) external networks. As illustrated in FIG. 3A, the gateway components 350 may include a public switched telephone network (PSTN) gateway 352, a mobile carrier gateways 354, a social networking gateway 356, an IP communication network gateway 358, and/or other gateways known to one of skill in the art. While FIG. 3A illustrates the gateway components 350 including a single gateway for each external network, this is intended for illustrative purposes only and the gateway components 350 may include multiple gateways for each external network without departing from the disclosure. For example, the gateway components 350 may include multiple PSTN gateways 352 having different locations without departing from the disclosure. Additionally or alternatively, a single type of external network may correspond to multiple external networks without departing from the disclosure. For example, the gateway components 350 may include a first mobile carrier gateway 354 corresponding to a first mobile carrier network and a second mobile carrier gateway 354 corresponding to a second mobile carrier network without departing from the disclosure. However, the disclosure is not limited thereto and two or more mobile carrier networks may share a mobile carrier gateway 354 without departing from the disclosure.

To illustrate an example of using the gateway components 350, the system 100 may use the PSTN gateway 352 to establish a communication session with a PSTN device (e.g., wired/wireless telephone, cellular phone, and/or the like that is associated with a PSTN telephone number) using the PSTN. For example, the system 100 may use the session signaling components 340 to send SIP data packets from a device 110 to a PSTN gateway 352. The PSTN gateway 352 may receive the SIP data packets, convert the SIP data packets to audio data in a different format, and send the audio data to the PSTN device via the PSTN. Thus, the gateway components 350 may include a plurality of gateways, with each gateway being associated with a specific external network and configured to act as an interface between the media transport system 102 and the external network.

FIG. 3B illustrates an example of signal paths and data flow between components within the media transport system 102. As illustrated in FIG. 3B, the skill component 305 may send data to a media transport system (MTS) application programming interface (API) 360. The MTS API 360 may include an MTS API gateway component 362 that receives the data (e.g., request) and sends data to the MESO component 310, the media processing components 320, the media routing components 330, and/or other components. For example, FIG. 3B illustrates the MTS API gateway component 362 communicating with the MESO component 310, the media control component 322, and the routing control component 332.

As described above with regard to FIG. 3A, the MESO component 310 may communicate with the media processing components 320, the media routing components 330, the session signaling components 340, and/or the gateway components 350. Internal signaling within the media transport system 102 is represented in FIG. 3B as dotted lines.

The components within the media transport system 102 may process the request received from the MTS API gateway component 362 and send data to the MTS API 360 in response to processing the request. For example, components within the media transport system 102 may send data to an MTS event bus 364 of the MTS API 360 and the MTS event bus 364 may send data (e.g., event, notification, etc.) to the skill component 305. Data sent as part of the MTS interface between the skill component 305 and the media transport system 102 is represented in FIG. 3B using a solid line.

As illustrated in FIG. 3B, the skill component 305 may communicate with the MPU 324. For example, the skill component 305 may communicate with an MPU pipeline instance 326 running within the MPU 324 that includes a skill MPU application 328. Thus, the skill component 305 may communicate directly with the skill MPU application as part of an application interface, which is represented as a dashed line in FIG. 3B. In addition to communicating with the skill component 305, the MPU pipeline instance 326 may send data (e.g., media content) to the devices 110, either directly or via the media relay components 334.

As used herein, an MPU pipeline instance or any other instance may refer to a specific component that is executing program code; all of the logic associated with the media processing unit is running in memory in a single host, which decreases latency associated with the media processing. For example, conventional techniques for executing asynchronous workflows perform checkpointing to store data in storage components between events. Thus, when a new event occurs, the conventional techniques retrieve the stored session and loads data into the memory, resulting in a large amount of latency. As part of reducing the latency, the media transport system 102 may use the MESO component 310 to route triggers and events directly to the MPU pipeline instance that is performing the media processing, enabling the media transport system 102 to perform media processing in real-time.

Using the MESO component 310, the media transport system 102 allows skills and/or applications to enable unique functionality without requiring the skill/application to independently develop and/or program the functionality. Thus, the media transport system 102 may offer media processing operations as a service to existing skills/applications. For example, the media transport system 102 may enable a skill to provide closed captioning or other features without building a closed captioning service. Instead, the media transport system 102 may route a communication session through an MPU 324 configured to perform closed captioning. Thus, an MPU 324 configured to enable a specific feature may be utilized to enable the feature on multiple skills without departing from the disclosure.

As the MESO component 310 is capable of executing requests and commands with low latency, the media transport system 102 may utilize multiple components within a single communication session. For example, the media transport system 102 may combine multiple different components (e.g., MPUs 324 associated with one or more skills) to piece together a custom implementation enabling a combination of existing features. To illustrate an example, the media transport system 102 may build back to back SIP user engine that is customizable for a specific implementation. Thus, the MESO component 310 may mix and match different components and/or features to provide a customized experience.

Figure 3C:
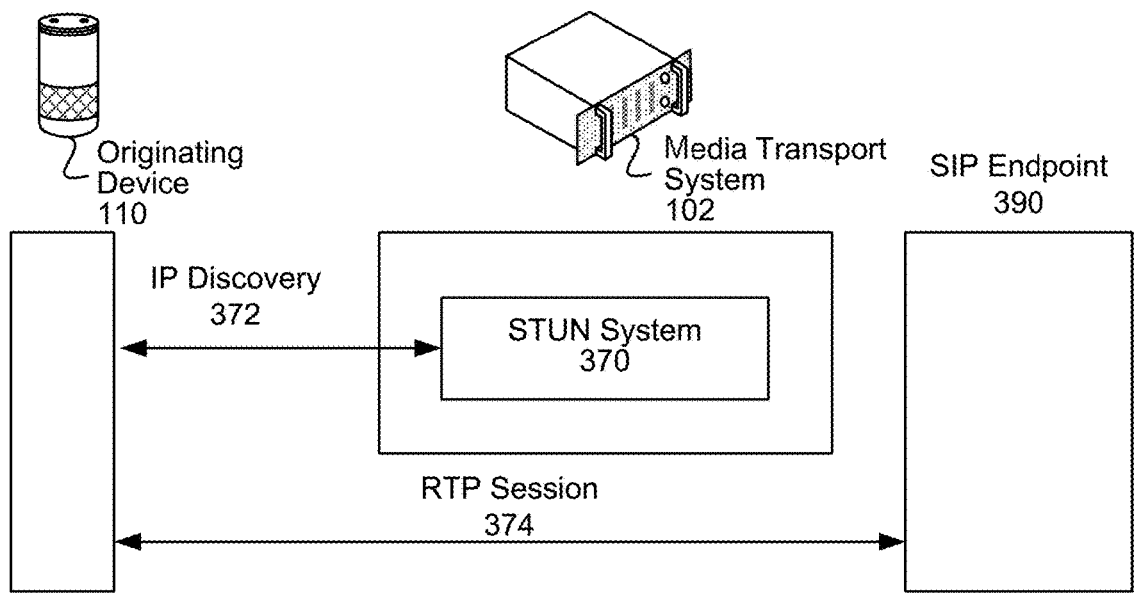
FIGS. 3C-3D illustrate examples of establishing media connections between devices according to embodiments of the present disclosure.
Figure 3D:
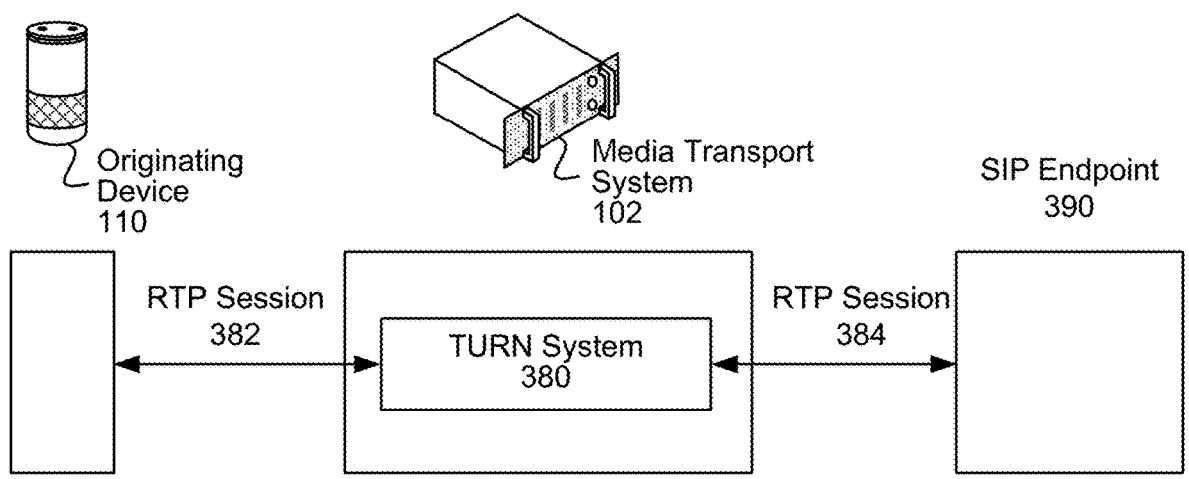

FIGS. 3C-3D illustrate examples of establishing media connections between devices according to embodiments of the present disclosure. In some examples, an originating device 110 may have a publicly accessible IP address and may be configured to establish a real-time transport (RTP) protocol communication session directly with a SIP endpoint 390. The SIP endpoint 390 may correspond to a device 110, a component within the media transport system 102, a gateway component configured to interface with a remote network, and/or a device associated with the remote network itself. To enable the originating device 110 to establish the RTP communication session, the media transport system 102 may include Session Traversal of User Datagram Protocol (UDP) Through Network Address Translators (NATs) system (e.g., STUN system 370). The STUN system 370 may be configured to allow NAT clients (e.g., an originating device 110 behind a firewall) to setup calls to a Voice over Internet Protocol (VoIP) provider hosted outside of the local network by providing a public IP address, the type of NAT they are behind, and a port identifier associated by the NAT with a particular local port. As illustrated in FIG. 3C, the originating device 110 may perform (372) IP discovery using the STUN system 370 and may use this information to set up an RTP communication session 374 (e.g., UDP communication) between the originating device 110 and the SIP endpoint 390 to establish a call.

In some examples, the originating device 110 may not have a publicly accessible IP address. For example, in some types of NAT the originating device 110 cannot route outside of the local network. To enable the originating device 110 to establish an RTP communication session, the media transport system 102 may include Traversal Using relays around NAT (TURN) system 380. The TURN system 380 may be configured to connect the originating device 110 to the SIP endpoint 390 when the originating device 110 is behind a NAT. As illustrated in FIG. 3D, the originating device 110 may establish (382) an RTP session with the TURN system 380 and the TURN system 380 may establish (384) an RTP session with the SIP endpoint 390. Thus, the originating device 110 may communicate with the SIP endpoint 390 via the TURN system 380. For example, the originating device 110 may send audio data and/or image data to the media transport system 102 and the media transport system 102 may send the audio data and/or the image data to the SIP endpoint 390. Similarly, the SIP endpoint 390 may send audio data and/or image data to the media transport system 102 and the media transport system 102 may send the audio data and/or the image data to the originating device 110.

In some examples, the system may establish communication sessions using a combination of the STUN system 370 and the TURN system 380 without departing from the disclosure. For example, a communication session may be more easily established/configured using the TURN system 380, but may benefit from latency improvements using the STUN system 370. Thus, the system may use the STUN system 370 when the communication session may be routed directly between two devices and may use the TURN system 380 for all other communication sessions. Additionally or alternatively, the system may use the STUN system 370 and/or the TURN system 380 selectively based on the communication session being established. For example, the system may use the STUN system 370 when establishing a communication session between two devices (e.g., point-to-point) within a single network (e.g., corporate LAN and/or WLAN), but may use the TURN system 380 when establishing a communication session between two devices on separate networks and/or three or more devices regardless of network(s).

When the communication session goes from only two devices to three or more devices, the system may need to transition from the STUN system 370 to the TURN system 380. Thus, if the system anticipates three or more devices being included in the communication session, the communication session may be performed using the TURN system 380. Similarly, when the communication session goes from three or more devices to only two devices, the system may need to transition from the TURN system 380 to the STUN system 370.

While FIGS. 3C-3D illustrate an RTP communication session being established between the originating device 110 and the SIP endpoint 390, the present disclosure is not limited thereto and the RTP communication session may be established between the originating device 110 and a gateway component or other device associated with the SIP endpoint 390 without departing from the present disclosure. Additionally or alternatively, while FIGS. 3C-3D illustrate examples of enabling communication sessions using the SIP protocol, the disclosure is not limited thereto and the media transport system 102 may use any protocols known to one of skill in the art.

While FIGS. 3C-3D illustrate examples of enabling communication sessions using a data connection (e.g., using Voice over Internet Protocol (VoIP), session initiation protocol (SIP), and/or the like), the disclosure is not limited thereto and the system 100 may enable communication sessions using any type of network without departing from the disclosure. For example, the media transport system 102 may enable communication sessions using a cellular connection (e.g., mobile phone network) or other external network without departing from the disclosure. For example, the media transport system 102 may send instructions (e.g., command data) to endpoints (e.g., caller devices, such as the device 110) instructing the endpoint to establish a communication session (e.g., dial a telephone number) in response to the voice command.

FIGS. 4 through 7 describe examples operations of the system 100 when presented with a potentially ambiguous spoken command. In the example operations described with reference to FIGS. 4 through 7, the entity to be resolved is a target entity for a communication session; for example, an intended recipient of a message, call, email, etc. The system 100 may perform similar operations for other action and entity types.

Figure 4:
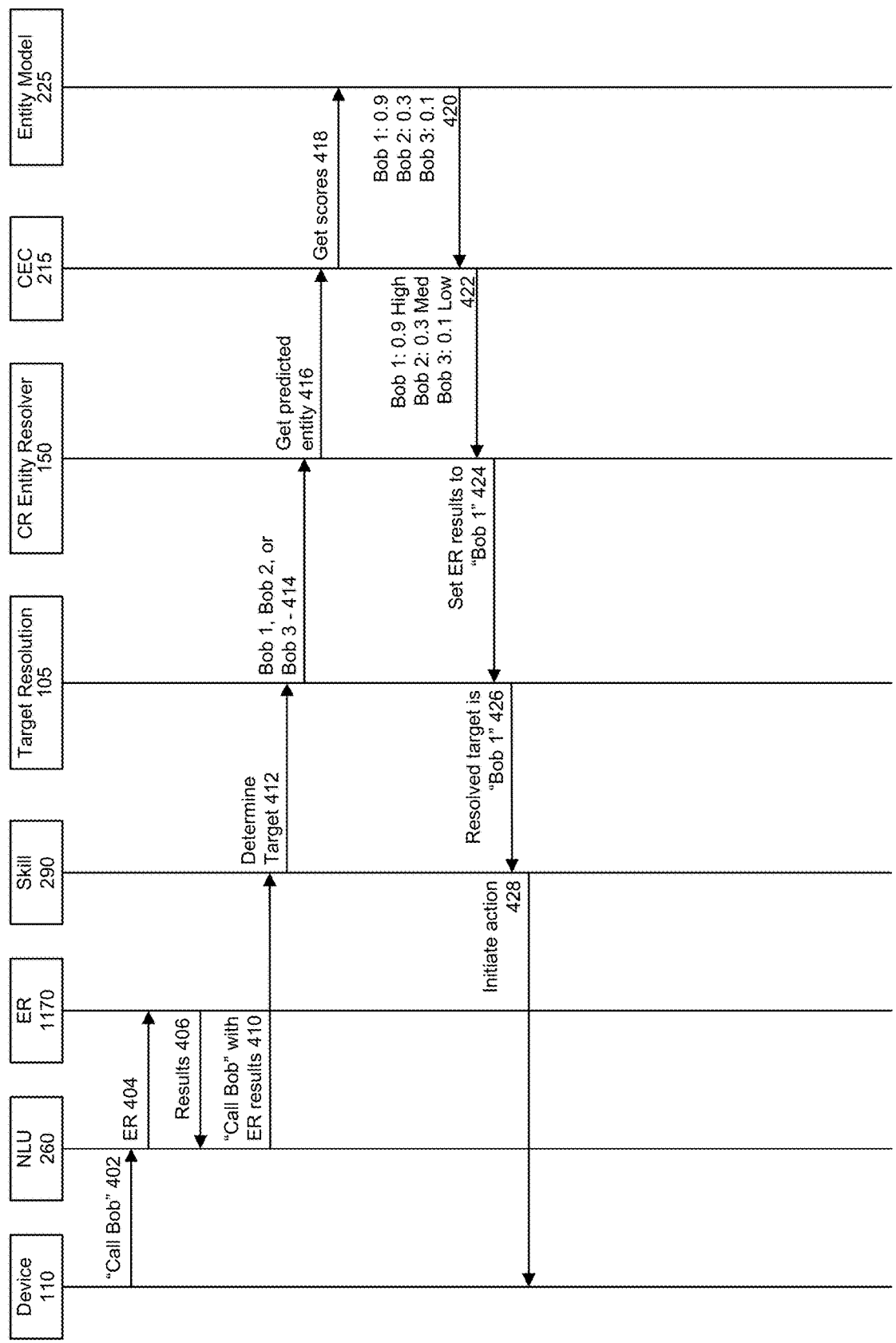
FIG. 4 is a signal flow diagram illustrating first example operations in which the system disambiguates an ambiguous target entity, according to embodiments of the present disclosure.

FIG. 4 is a signal flow diagram illustrating first example operations in which the system 100 disambiguates an ambiguous target entity, according to embodiments of the present disclosure. The diagram illustrates communications between the device 110, the language processing component 240, entity resolution component 1170, the skill component 290, the target resolution component 105, the CR entity resolver 150, the CEC 215, and the entity model 225. Some operations may be omitted for clarity.

The device 110 may receive input representing, for example, a command: "Call Bob." The device 110 may transmit 402 data representing the input to the language processing component 240. The NLU component 260 of the language processing component 240 may perform processing on the data. In some cases, the input data may be audio data representing an utterance. In such cases, ASR processing by the ASR component 250 of the language processing component 240 may precede the NLU processing. The NLU component 260 may send 404 NLU data to the entity resolution component 1170 for initial entity resolution. The entity resolution component 1170 may return 406 ER results to the NLU component 260. The ER results may include a list of one or more candidate entities related to one or more slots in the audio data. The NLU component 260 may determine an intent associated with the audio data, and determine a skill component 290 corresponding to that intent. The NLU component 260 may send 410 NLU results data including the entity candidates to the skill component 290. Upon receiving the NLU results data, the skill component 290 may, based on confidence scores associated with the entity candidates, determine that a target of the command is ambiguous or otherwise subject to identification and/or confirmation. Accordingly, the skill component 290 may send 412 a request to the target resolution component 105 to determine the target. The target resolution component 105 may send 414 the entity candidates to the CR entity resolver 150. The CR entity resolver 150 may call 416 on the CEC 215 to get a predicted entity. The CEC 215 may retrieve features from the action log 145 via one or more FCs, and send 418 the features and candidate entities to the entity model 225 for scoring. The entity model 225 may return 420 scores for each candidate entity. The CEC 215 may assign the entity candidates to bins (e.g., high, medium, and low) based on the scores from the entity model 225. In this example, the CEC 215 returns the following scores and bins for the entity candidate:

Bob 1: 0.9 High
Bob 2: 0.3 Med
Bob 3: 0.1 Low

The CEC 215 may send 422 the scores and/or bins associated with the entity candidates to the CR entity resolver 150. The CR entity resolver 150 may determine based on the scores and/or bins that a confidence associated with "Bob 1" satisfies a condition, and thus may set "Bob 1" as the predicted target. The CR entity resolver 150 may set the entity resolution results to "Bob 1," and send 424 the entity resolution results to the target resolution component 105. The target resolution component 105 may send 426 the skill component 290 data indicating that the resolved target is "Bob 1." The skill component 290 can thus initiate 428 the action at the device 110.

The example operations shown in FIG. 4 describe a scenario in which the skill component 290 determines that a target is ambiguous, but the system 100 is able to disambiguate the target without prompting the user 5. The example operations shown in FIG. 5 describe a scenario in which the system 100 is unable to determine a single high confidence match for the target from among the entity candidates, and thus outputs a prompt for the user to disambiguate the target.

Figure 5:
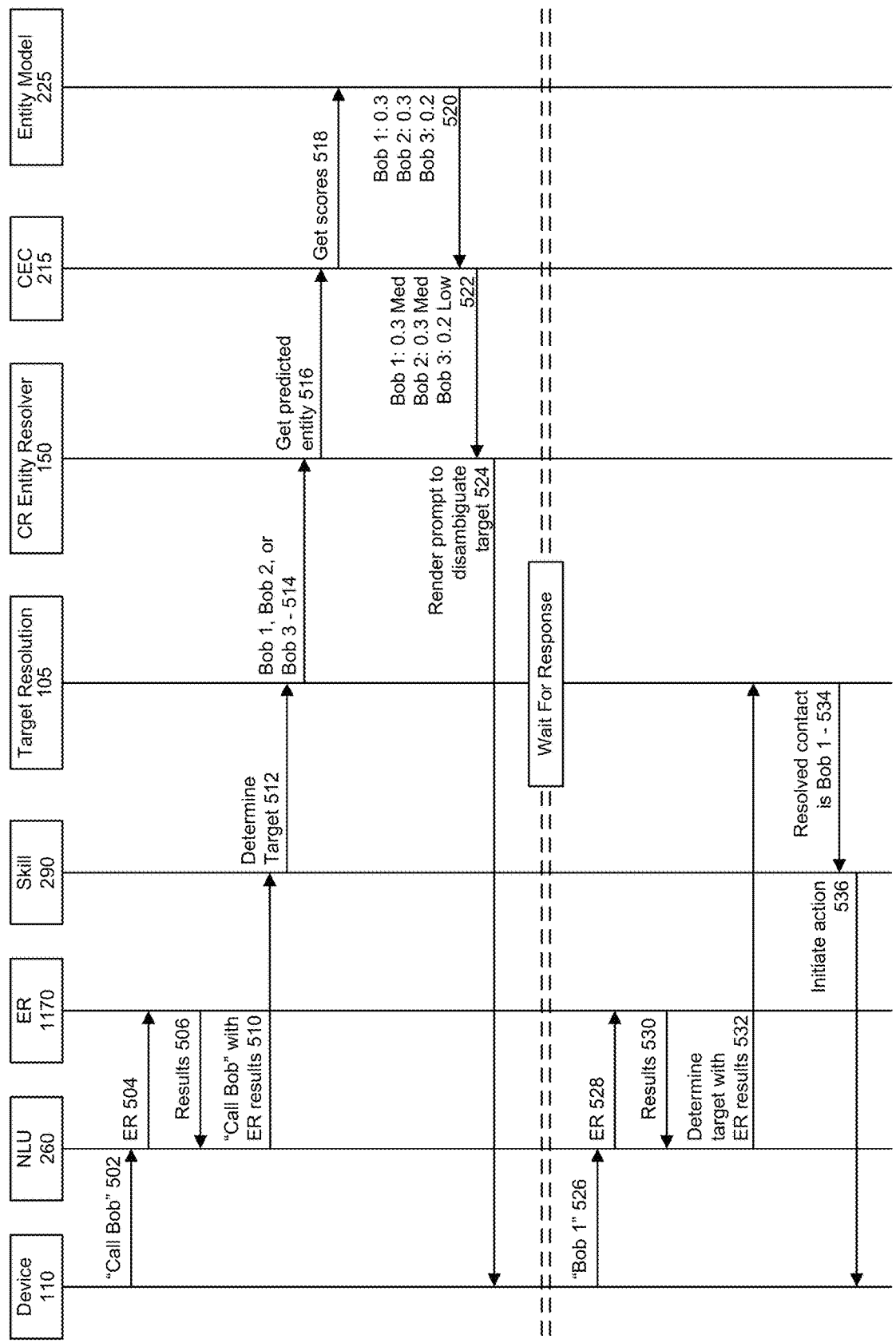
FIG. 5 is a signal flow diagram illustrating second example operations in which the system requests disambiguation regarding a target entity, according to embodiments of the present disclosure.

FIG. 5 is a signal flow diagram illustrating second example operations in which the system 100 requests disambiguation regarding a target entity, according to embodiments of the present disclosure. Steps 502-518 are similar to steps 402 through 418, respectively. In this example, however, the entity model 225 and the CEC 215 return 520 the following scores and bins for the entity candidates:
- Bob 1: 0.3 Med
- Bob 2: 0.3 Med
- Bob 3: 0.1 Low Unlike in FIG. 4, the CEC 215 may determine scores/bins that do not indicate a clear highest score match. The CEC 215 may send 522 the scores and/or bins associated with the entity candidates to the CR entity resolver 150. The CR entity resolver 150 may determine based on the scores and/or bins that no single highest score—e.g., predicted target—can be determined based on the scores from the entity model 225. Accordingly, the CR entity resolver 150 may cause 524 the system 100 to output a prompt requesting disambiguation of the target; for example, via the TTS component 280 and the device 110.

The device 110 may receive second input in response to the prompt. The device 110 may send 526 second data to the NLU component 260 (or ASR component 250). The NLU component 260 may request 528 entity resolution of an entity detected in the second data. The entity resolution component 1170 may return 530 entity resolution results. The NLU component 260 may determine the target based on the entity resolution results and send 532 an indication of the target entity to the target resolution component 105. The target resolution component 105 may send 534 the resolved contact to the skill component 290. The skill component 290 may initiate 536 the requested action at the device 110.

Figure 6:
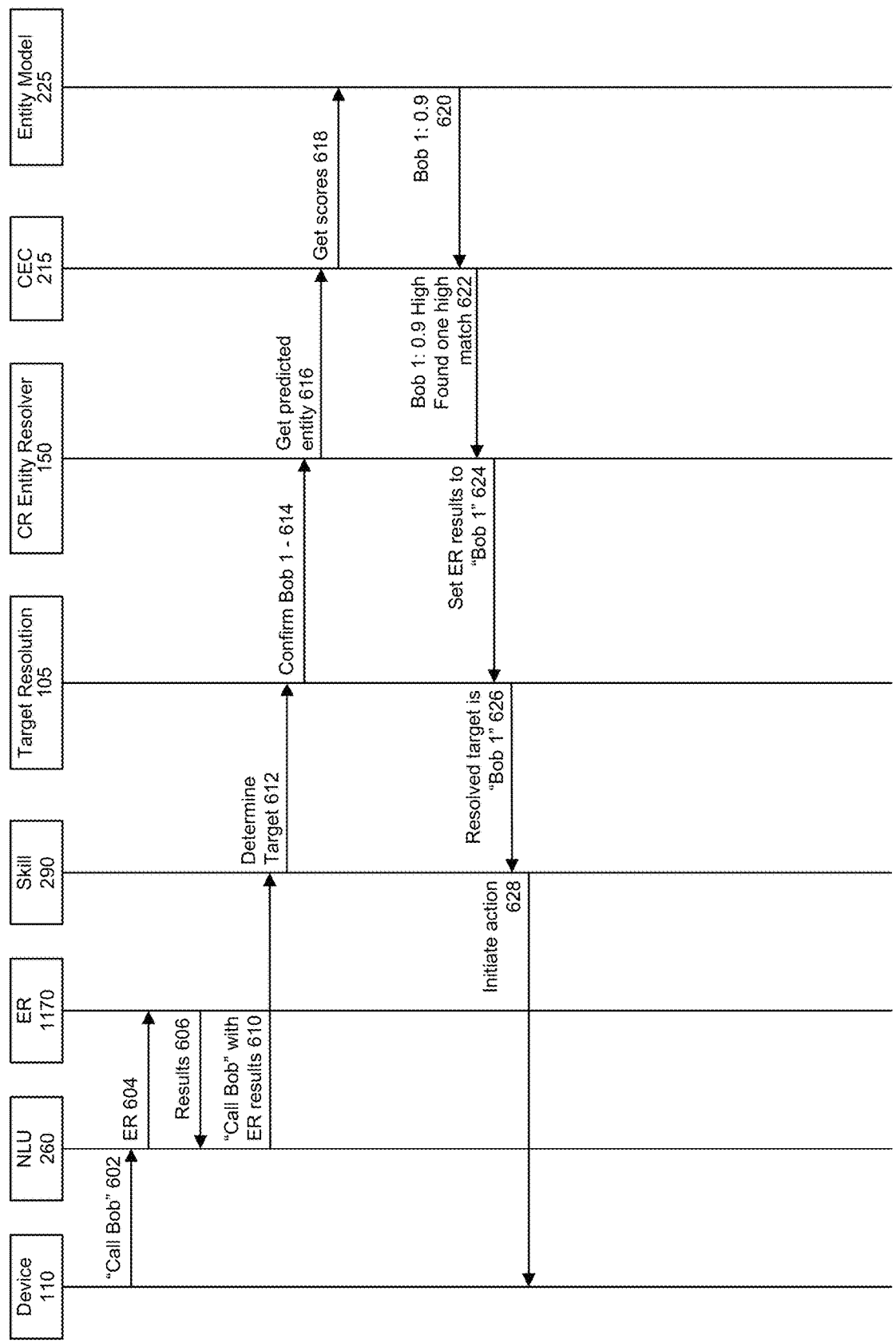
FIG. 6 is a signal flow diagram illustrating third example operations in which the system automatically confirms a target entity selection, according to embodiments of the present disclosure.
Figure 7:
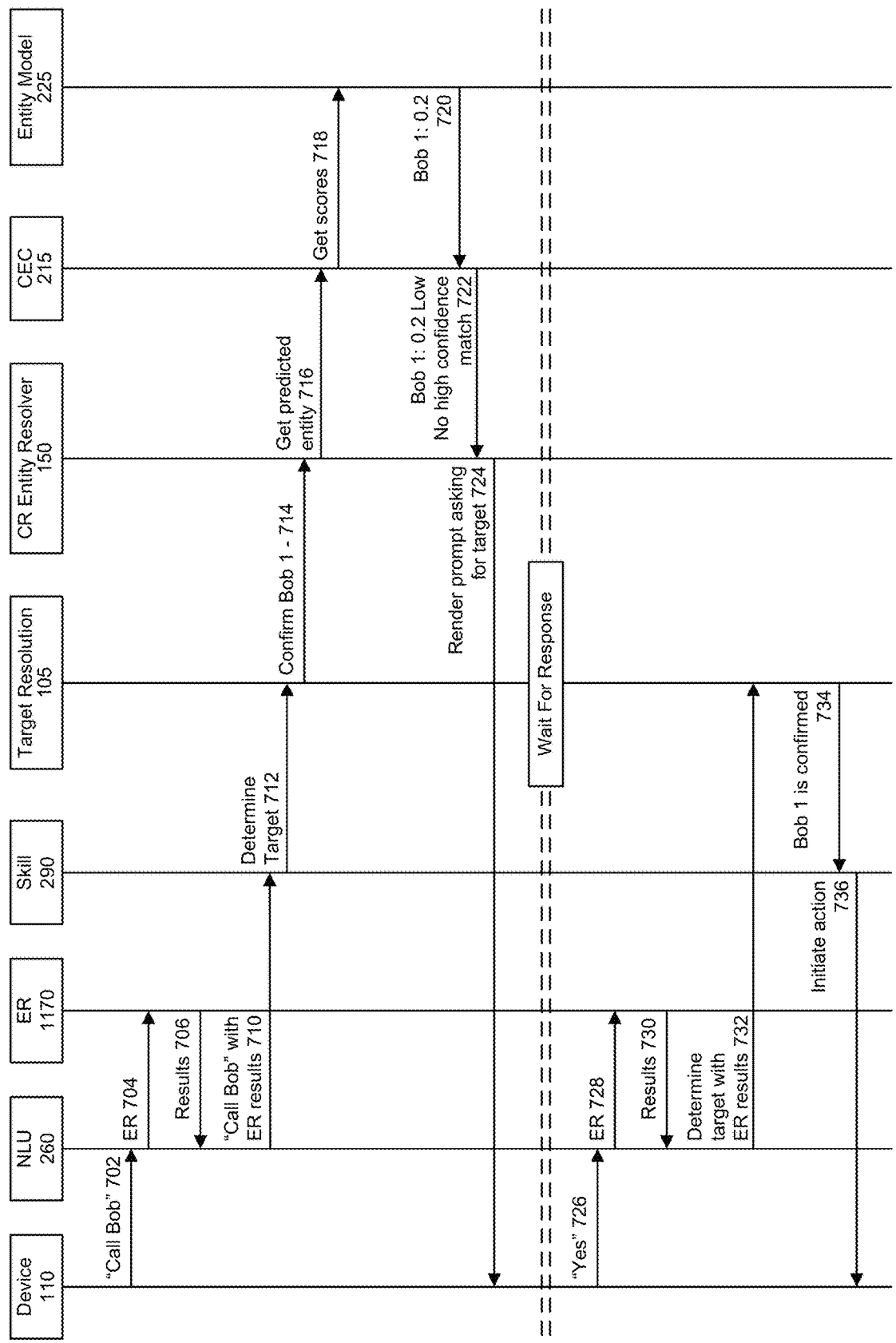
FIG. 7 is a signal flow diagram illustrating fourth example operations in which the system requests confirmation of a target entity selection, according to embodiments of the present disclosure.

In the examples shown in FIGS. 6 and 7, the system 100 identifies and scores an entity candidate, with or without user 5 confirmation depending on the score determined by the entity model 225. FIG. 6 is a signal flow diagram illustrating third example operations in which the system automatically confirms a target entity selection, according to embodiments of the present disclosure. Steps 602-618 are similar to steps 402 through 418, respectively. In this example, however, the entity model 225 and the CEC 215 return 620 the following scores and bins for the entity candidate: "Bob 1: 0.9 High."

The CEC 215 may send 622 the score and/or bin associated with the entity candidate to the CR entity resolver 150. The CR entity resolver 150 may determine based on the score and/or bin that a confidence associated with "Bob 1" satisfies a condition, and thus may set "Bob 1" as the predicted target. The CR entity resolver 150 may set the entity resolution results to "Bob 1," and send 624 the entity resolution results to the target resolution component 105. The target resolution component 105 may send 626 the skill component 290 data indicating that the resolved target is "Bob 1." The skill component 290 can thus initiate 628 the action at the device 110.

FIG. 7 is a signal flow diagram illustrating fourth example operations in which the system requests confirmation of a target entity selection, according to embodiments of the present disclosure. Steps 702-718 are similar to steps 602 through 618, respectively. In this example, however, the entity model 225 and the CEC 215 return 720 the following scores and bins for the entity candidate: "Bob 1: 0.2 Low."

Unlike in FIG. 6, the CEC 215 may determine a score/bin that does not indicate a high enough confidence in the entity candidate to forego confirmation. The CEC 215 may send 722 the score and/or bin associated with the entity candidate to the CR entity resolver 150. The CR entity resolver 150 may determine based on the score and/or bin that no predicted target can be determined. Accordingly, the CR entity resolver 150 may cause 724 the system 100 to output a prompt requesting confirmation of the target; for example, via the TTS component 280 and the device 110.

The device 110 may receive second input in response to the prompt. The device 110 may send 726 second data to the NLU component 260 (or ASR component 250). The NLU component 260 may request 728 entity resolution of an entity detected in the second data. The entity resolution component 1170 may return 730 entity resolution results. In some implementations, the response may consist of a "yes"/"no" answer that the system 100 may process using a simplified audio processing; that is, without one or more of the ASR, NLU, and/or ER processing. The NLU component 260 may determine the target based on the response and send 732 an indication of the target entity to the target resolution component 105. The target resolution component 105 may send 734 the resolved contact to the skill component 290. The skill component 290 may initiate 736 the requested action at the device 110.

Figure 8:
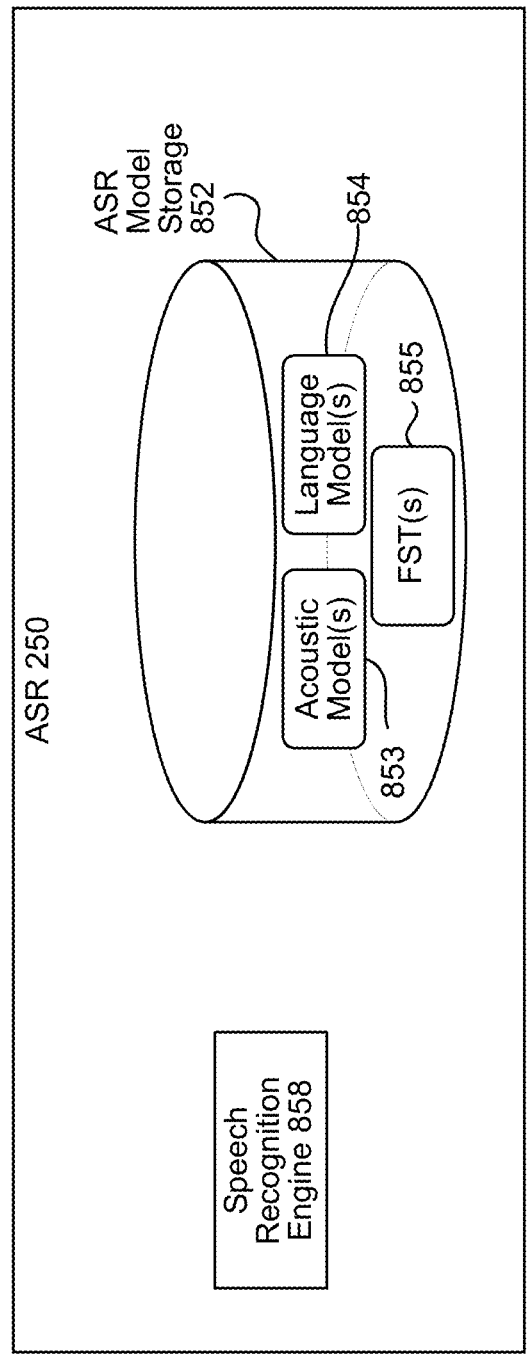
FIG. 8 is a conceptual diagram of ASR components, according to embodiments of the present disclosure.

FIG. 8 is a conceptual diagram of an ASR component 250, according to embodiments of the present disclosure. The ASR component 250 may interpret a spoken natural language input based on the similarity between the spoken natural language input and pre-established language models 854 stored in an ASR model storage 852. For example, the ASR component 250 may compare the audio data with models for sounds (e.g., subword units or phonemes) and sequences of sounds to identify words that match the sequence of sounds spoken in the natural language input. Alternatively, the ASR component 250 may use a finite state transducer (FST) 855 to implement the language model functions.

When the ASR component 250 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 853 stored in the ASR model storage 852), and the likelihood that a particular word, which matches the sounds, would be included in the sentence at the specific location (e.g., using a language or grammar model 854). Based on the considered factors and the assigned confidence score, the ASR component 250 may output an ASR hypothesis that most likely matches the spoken natural language input, or may output multiple ASR hypotheses in the form of a lattice or an N-best list, with each ASR hypothesis corresponding to a respective score.

The ASR component 250 may include a speech recognition engine 858. The ASR component 250 receives audio data 211 (for example, received from a local device 110 having processed audio detected by a microphone by an acoustic front end (AFE) or other component). The speech recognition engine 858 compares the audio data 211 with acoustic models 853, language models 854, FST(s) 855, and/or other data models and information for recognizing the speech conveyed in the audio data. In some implementations, the speech recognition engine 858 may retrieve personalized models that may be specific to a particular user, group, or device. The personalized models may be identified based on the user recognition data generated by the user recognition component 295. The audio data 211 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 858 may process the audio data 211 with reference to information stored in the ASR model storage 852. Feature vectors of the audio data 211 may arrive at the remote system 120 encoded, in which case they may be decoded prior to processing by the speech recognition engine 858.

Figure 9:
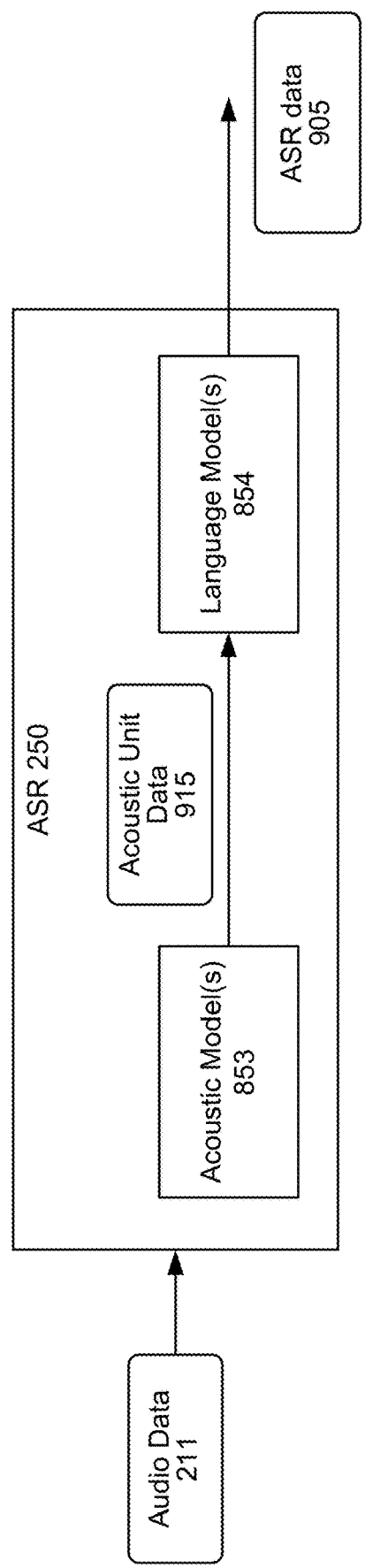
FIG. 9 is a conceptual diagram showing ASR processing using ASR components, according to embodiments of the present disclosure.

FIG. 9 is a conceptual diagram showing ASR processing in an ASR component 250, according to embodiments of the present disclosure. The speech recognition engine 858 attempts to match received feature vectors to language acoustic units (e.g., phonemes) and words as known in the stored acoustic models 853, language models 854, and FST(s) 855. For example, as illustrated in FIG. 9, the audio data 211 may be processed by one or more acoustic model(s) 853 to determine acoustic unit data 915. The acoustic unit data 915 may include indicators of acoustic units detected in the audio data 211 by the ASR component 250. For example, acoustic units can consist of one or more of phonemes, diaphonemes, tonemes, phones, diphones, triphones, or the like. The acoustic unit data 915 can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data 915 may be processed using the language model 854 (and/or using FST 855) to determine ASR data 905. The ASR data can include one or more hypotheses. One or more of the hypotheses represented in the ASR data 905 may then be sent to further components (such as the NLU component 260) for further processing as discussed herein.

The speech recognition engine 858 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 250 will output ASR hypotheses that make sense grammatically. The specific models used may be general models or may be models corresponding to a particular domain, such as music, banking, etc.

The speech recognition engine 858 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 858 may use the acoustic model(s) 853 to attempt to match received audio feature vectors to words or subword acoustic units. An acoustic unit may be a senone, phoneme, phoneme in context, syllable, part of a syllable, syllable in context, or any other such portion of a word. The speech recognition engine 858 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 250 outputs ASR hypotheses that make sense grammatically.

The speech recognition engine 858 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 858, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 858 may also compute scores of branches of the paths based on language models or grammars. Language modeling involves determining scores for what words are likely to be used together to form coherent words and sentences. Application of a language model may improve the likelihood that the ASR component 250 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

In one example, the speech recognition engine 858 may receive a series of feature vectors for sound corresponding to a user saying "There is a bat in my car." The speech recognition engine 858 may attempt to match each feature vector with a phoneme. As new feature vectors are processed, the speech recognition engine 858 may determine state transitions (for example, using HMMs) to determine whether a probability of whether a state should either remain the same, or change to a new state, i.e., whether an incoming feature vector results in a state transition from one phone to another. As the processing continues, the speech recognition engine 858 continues calculating such state transition probabilities. After processing one feature vector, the speech recognition may move to the next feature vector.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the speech recognition engine 858 may also calculate potential states for other phonemes. In this manner multiple states and state transition probabilities may be calculated.

The probable states and probable state transitions calculated by the speech recognition engine 858 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The speech recognition engine 858 may also compute scores of branches of the paths based on language models or grammars. Language modeling involves determining scores for what words are likely to be used together to form coherent words and sentences. Application of a language model may improve the likelihood that the ASR component 250 correctly interprets the speech contained in the audio data. For example, acoustic model processing returning the potential phoneme paths of "B A T", "B A D", and "B E D" may be adjusted by a language model to adjust the recognition scores of "B A T" (interpreted as the word "bat"), "B A D" (interpreted as the word "bad"), and "B E D" (interpreted as the word "bed") based on the language context of each word within the spoken utterance. The language modeling may be determined from a text corpus and may be customized for particular applications.

As the speech recognition engine 858 determines potential words from the input audio the lattice may become very large as many potential sounds and words are considered as potential matches for the input audio. The potential matches may be illustrated as a word result network representing possible sequences of words that may be recognized and the likelihood of each sequence.

FIGS. 10 and 11 illustrates how the NLU component 260 may perform NLU processing. FIG. 10 is a conceptual diagram of how natural language processing is performed, according to embodiments of the present disclosure. And FIG. 11 is a conceptual diagram of how natural language processing is performed, according to embodiments of the present disclosure. The NLU component 260 may include one or more recognizers 1063. In at least some embodiments, a recognizer 1063 may be associated with a skill support system 292 (e.g., the recognizer may be configured to interpret text data to correspond to the skill support system 292). In at least some other examples, a recognizer 1063 may be associated with a domain (e.g., the recognizer may be configured to interpret text data to correspond to the domain).

Recognizers 1063 may process text data in parallel, in series, partially in parallel, etc. For example, a recognizer corresponding to a first domain may process text data at least partially in parallel to a recognizer corresponding to a second domain. For further example, a recognizer corresponding to a first skill system may process text data at least partially in parallel to a recognizer corresponding to a second skill system.

The NLU component 260 may communicate with various storages. The NLU component 260 may communicate with an NLU storage 1073, which includes skill system grammars (1076a-1076n), representing how natural language inputs may be formulated to invoke skill support systems 292, and skill system intents (1078a-1078n) representing intents supported by respective skill support systems 292.

Each recognizer 1063 may be associated with a particular grammar 1076, a particular intent(s) 1078, and a particular personalized lexicon 1086 (stored in an entity library 1082). A gazetteer 1084 may include skill system-indexed lexical information associated with a particular user. For example, Gazetteer A (1084a) may include skill system-indexed lexical information 1086aa to 1086an. A user's music skill system lexical information might include album titles, artist names, and song names, for example, whereas a user's contact list skill system lexical information might include the names of contacts. Since every user's music collection and contact list is presumably different, this personalized information may improve entity resolution.

Each recognizer 1063 may include a NER component 1062 that attempts to identify grammars and lexical information that may be used to construe meaning with respect to text data input therein. A NER component 1062 identifies portions of text data that correspond to a named entity that may be recognizable by the remote system 120. A NER component 1062 may also determine whether a word refers to an entity that is not explicitly mentioned in the text, for example "him," "her," "it" or other anaphora, exophora or the like.

A NER component 1062 applies grammar models 1076 and lexical information 1086 associated with one or more skill support systems 292 to determine a mention of one or more entities in text data input therein. In this manner, a NER component 1062 identifies "slots" (e.g., particular words in text data) that may be needed for later processing. A NER component 1062 may also label each slot with a type (e.g., noun, place, city, artist name, song name, etc.).

Each grammar model 1076 may include the names of entities (e.g., nouns) commonly found in speech about a particular skill support system 292 to which the grammar model 1076 relates, whereas lexical information 1086 may be personalized to the user identifier output by a user recognition component 295 for the natural language input. For example, a grammar model 1076 associated with a shopping skill system may include a database of words commonly used when people discuss shopping.

A downstream process called named entity resolution actually links a portion of text data (identified by a NER component 1062) to a specific entity known to the system 120. To perform named entity resolution, the NLU component 260 may use gazetteer information (1084a-1084n) stored in the entity library storage 1082. The gazetteer information 1084 may be used to match text data (identified by a NER component 1062) with different entities, such as song titles, contact names, etc. Gazetteers may be linked to users (e.g., a particular gazetteer may be associated with a specific user's music collection), may be linked to certain skill support systems 292 (e.g., a shopping skill system, a music skill system, a video skill system, a communications skill system, etc.), or may be organized in another manner.

Each recognizer 1063 may also include an intent classifier (IC) component 1064 that processes text data input thereto to determine an intent(s) of a skill support system(s) 292 that potentially corresponds to the natural language input represented in the text data. An intent corresponds to an action to be performed that is responsive to the natural language input represented by the text data. An IC component 1064 may communicate with a database 1078 of words linked to intents. For example, a music intent database may link words and phrases such as "quiet," "volume off," and "mute" to a <Mute> intent. An IC component 1064 identifies potential intents by comparing words and phrases in text data to the words and phrases in an intents database 1078 associated with the skill support system(s) 292 that is associated with the recognizer 1063 implementing the IC component 1064.

The intents identifiable by a specific IC component 1064 may be linked to one or more skill system-specific grammar frameworks 1076 with "slots" to be filled. Each slot of a grammar framework 1076 corresponds to a portion of text data that a NER component 1062 believes corresponds to an entity. For example, a grammar framework 1076 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 1076 may not be structured as sentences, but rather based on associating slots with grammatical tags.

For example, a NER component 1062 may identify words in text data as subject, object, verb, preposition, etc. based on grammar rules and/or models prior to recognizing named entities in the text data. An IC component 1064 (implemented by the same recognizer 1063) may use the identified verb to identify an intent. The NER component 1062 may then determine a grammar model 1076 associated with the identified intent. For example, a grammar model 1076 for an intent corresponding to <PlayMusic> may specify a list of slots applicable to play the identified "object" and any object modifier (e.g., a prepositional phrase), such as {Artist Name}, {Album Name}, {Song name}, etc. The NER component 1062 may then search corresponding fields in a lexicon 1086, attempting to match words and phrases in the text data the NER component 1062 previously tagged as a grammatical object or object modifier with those identified in the lexicon 1086.

A NER component 1062 may perform semantic tagging, which is the labeling of a word or combination of words according to their type/semantic meaning. A NER component 1062 may parse text data using heuristic grammar rules, or a model may be constructed using techniques such as hidden Markov models, maximum entropy models, log linear models, conditional random fields (CRF), and the like. For example, a NER component 1062, implemented by a music skill system or music domain recognizer 1063, may parse and tag text data corresponding to "play the well-tempered clavier by johann sebastian bach" as {Verb}: "Play," {Object}: "the well-tempered clavier," {Object Preposition}: "by," and {Object Modifier}: "johann sebastian bach." The NER component 1062 may identify "Play" as a verb based on a word database associated with the music skill system or music domain, which an IC component 1064 may determine corresponds to a <PlayMusic> intent. At this stage, no determination has been made as to the meaning of "the well-tempered clavier" and "johann sebastian bach," but based on grammar rules and models, the NER component 1062 has determined that the text of these phrases relates to the grammatical object (e.g., entity).

The frameworks linked to the intent are then used to determine what database fields should be searched to determine the meaning of these phrases, such as searching a particular user's gazetteer 1084 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 1084 does not resolve a slot/field using gazetteer information, the NER component 1062 may search a database of generic words (in the knowledge base 1072). For example, if the text data corresponds to "play songs by johann sebastian bach," after failing to determine an album name or song name called "songs" by "johann sebastian bach," the NER component 1062 may search a music skill system vocabulary for the word "songs." In the alternative, generic words may be checked before the gazetteer information, or both may be tried, potentially producing two different results.

A recognizer 1063 may tag text data to attribute meaning thereto. For example, a recognizer 1063 may tag "play the well-tempered clavier by johann sebastian bach" as: {skill system} Music, {intent} Play Music, {artist name} johann sebastian bach, {media type} SONG, and {song title} the well-tempered clavier. For further example, a recognizer 1063 may tag "play songs by johann sebastian bach" as: {skill system} Music, {intent} Play Music, {artist name} johann sebastian bach, and {media type} SONG.

As described above, more than one recognizer 1063 may process with respect to text data representing a single natural language input. In such instances, each recognizer 1063 may output NLU hypothesis data including at least one NLU hypothesis including an intent indicator (determined by an IC component 1064 of the recognizer 1063) and at least one tagged named entity (determined by a NER component 1062 of the recognizer 1063).

The NLU component 260 may compile the NLU hypotheses (output by multiple recognizers 1063) into cross-recognizer N-best list data 1140. Each NLU hypothesis may be associated with a respective score indicating a likelihood that the NLU hypothesis corresponds to the domain, one or more skill support systems 292, etc. associated with the recognizer 1063 from which the NLU hypothesis was output. For example, the cross-recognizer N-best list data 1140 may be represented as:

[0.95] Intent: <PlayMusic> ArtistName: Beethoven SongName: Waldstein Sonata

[0.70] Intent: <PlayVideo> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata with each line of the foregoing corresponding to a different NLU hypothesis and associated score.

The NLU component 260 may send the cross-recognizer N-best list data 1140 to a pruning component 1150, which sorts the NLU hypotheses, represented in the cross-recognizer N-best list data 1140, according to their respective scores. The pruning component 1150 may then perform score thresholding with respect to the cross-recognizer N-best list data 1140. For example, the pruning component 1150 may select NLU hypotheses, represented in the cross-recognizer N-best list data 1140, associated with scores satisfying (e.g., meeting and/or exceeding) a threshold score. The pruning component 1150 may additionally or alternatively perform number of NLU hypothesis thresholding. For example, the pruning component 1150 may select a threshold number of top-scoring NLU hypotheses represented in the cross-recognizer N-best list data 1140.

The pruning component 1150 may generate cross-recognizer N-best list data 1160 including the selected NLU hypotheses. The purpose of the pruning component 1150 is to create a reduced list of NLU hypotheses so that downstream, more resource intensive, processes may only operate on NLU hypotheses that most likely represent the natural language input.

The NLU component 260 may include a light slot filler component 1152 that takes text from slots, represented in the NLU hypotheses output by the pruning component 1150, and alter it to make the text more easily processed by downstream components. The light slot filler component 1152 may perform low latency operations that do not involve heavy operations such as reference to a knowledge base. The purpose of the light slot filler component 1152 is to replace words with other words or values that may be more easily understood by downstream components. For example, if a NLU hypothesis includes the word "tomorrow," the light slot filler component 1152 may replace the word "tomorrow" with an actual date for purposes of downstream processing. Similarly, the light slot filler component 1152 may replace the word "CD" with "album" or the words "compact disc." The replaced words are then included in the cross-recognizer N-best list data 1160.

The cross-recognizer N-best list data 1160 may be sent to an entity resolution component 1170. The entity resolution component 1170 can apply rules or other instructions to standardize labels or tokens in the NLU hypotheses represented in the cross-recognizer N-best list data 1160. The precise transformation may depend on the skill support system 292, domain, etc. to which a NLU hypothesis relates. For example, for a travel skill system-specific NLU hypothesis, the entity resolution component 1170 may transform text corresponding to "Boston airport" to the standard BOS three-letter code referring to the airport. The entity resolution component 1170 can refer to a knowledge base that is used to specifically identify the precise entity referred to in each slot of each NLU hypothesis represented in the cross-recognizer N-best list data 1160.

Specific intent/slot combinations may also be tied to a particular source, which may then be used to resolve the text. In the example "play songs by the stones," the entity resolution component 1170 may reference a personal music catalog, Amazon Music account, a user profile, or the like with entity data that the entity resolution component 1170 can leverage to identify entities corresponding to slots or entity mentions in the cross-recognizer N-best list data 1160. The entity resolution component 1170 may refer to one or more search indices 1162. The search index 1162 may be a data structure including one or more lists, tables, catalogs, etc. In some cases, the search index 1162 can include similar or same entity lists as contained in the user-specific entity data stored in the profile storage 270. The entity resolution component 1170 may output N-best list data, altered from the cross-recognizer N-best list data 1160, that includes more detailed information (e.g., entity IDs) about the specific entities mentioned in the slots and/or more detailed slot data that can eventually be used by a skill support system 292 to perform an action responsive to the natural language input. The NLU component 260 may include multiple entity resolution components 1170 that are each specific to one or more different skill support systems 292, domains, etc.

The NLU component 260 may include a ranker component 1190 that assigns a particular score to each NLU hypothesis input therein. The score of a particular NLU hypothesis may be affected by whether the NLU hypothesis has unfilled slots. For example, if a first NLU hypothesis includes slots that are all filled/resolved, the ranker component 1190 may assign the first NLU hypothesis a higher score than a second NLU hypothesis including at least one slot that is unfilled/unresolved by the entity resolution component 1170.

The ranker component 1190 may apply re-scoring, biasing, or other techniques. To do so, the ranker component 1190 may consider not only the data output by the entity resolution component 1170, but may also consider other data 1191. The other data 1191 may include a variety of information including information specific to a context of the received audio data, such as a device type or capabilities of the receiving device 110, an identity of the user as determined by the user recognition component 295, and/or information related to the skills or skill support systems 292.

For example, the other data 1191 may include skill support system 292 rating or popularity data. For example, if a skill support system 292 has a high rating, the ranker component 1190 may increase the score of a NLU hypothesis associated with that skill support system 292, and vice versa.

The other data 1191 may additionally or alternatively include information about skill support systems 292 that have been enabled by the user that originated the natural language input. For example, the ranker component 1190 may assign higher scores to NLU hypotheses associated with enabled skill support systems 292 than NLU hypotheses associated with skill support systems 292 that have not been enabled by the user.

The other data 1191 may additionally or alternatively include data indicating system usage history (e.g., specific to the user), such as if the user, that originated the natural language input, regularly invokes a particular skill support system 292 or does so at particular times of day. The other data 1191 may additionally or alternatively include data indicating date, time, location, weather, type of device 110, user identifier, context, as well as other information. For example, the ranker component 1190 may consider when any particular skill support system 292 is currently active with respect to the present user and/or device 110 (e.g., music being output by the skill support system 292, a game being executed by the skill support system 292, etc.).

The ranker component 1190 may output NLU results data 1135 including one or more NLU hypotheses. The NLU component 260 may send the NLU results data 1135 to the orchestrator component 230.

As described above, the system 120 may perform speech processing using two different components (e.g., the ASR component 250 and the NLU component 260). One skilled in the art will appreciate that the system 120, in at least some embodiments, may implement a spoken language understanding (SLU) component that is configured to process audio data 211 to generate NLU results data.

In some examples, the SLU component may be equivalent to the ASR component 250 and the NLU component 260. While the SLU component may be equivalent to a combination of the ASR component 250 and the NLU component 260, the SLU component may process audio data 211 and directly generate the NLU results data 1135, without an intermediate step of generating text data (as does the ASR component 250). As such, the SLU component may take audio data 211 representing speech and attempt to make a semantic interpretation of the speech. That is, the SLU component may determine a meaning associated with the speech and then implement that meaning. For example, the SLU component may interpret audio data 211 representing speech from the user 5 in order to derive a desired action. In some examples, the SLU component outputs NLU hypothesis data including a most likely NLU hypothesis, or multiple NLU hypotheses in the form of a lattice or an N-best list with individual NLU hypotheses corresponding to confidence scores or other scores (such as probability scores, etc.).

The device 110 and/or the remote system 120 may include a user recognition component 295 that recognizes one or more users using a variety of data. As illustrated in FIG. 12, the user recognition component 295 may include one or more subcomponents including a vision component 1208, an audio component 1210, a biometric component 1212, a radio frequency (RF) component 1214, a machine learning (ML) component 1216, and a recognition confidence component 1218. In some instances, the user recognition component 295 may monitor data and determinations from one or more subcomponents to determine an identity of one or more users associated with data input to the device 110 and/or the remote system 120. The user recognition component 295 may output user recognition data 1295, which may include a user identifier associated with a user the user recognition component 295 determines originated data input to the device 110 and/or the remote system 120. The user recognition data 1295 may be used to inform processes performed by various components of the device 110 and/or the remote system 120. For example, user recognition data 1295 may be used to select one or more user-specific entity libraries and/or gazetteers during ASR. The user-specific libraries may include names from a contact list, names of nearby businesses or businesses frequented by the user, idiomatic expressions used by the user, and/or words and/or phrases in one or more languages other than the primary language typically used with the device 110, etc.

The vision component 1208 may receive data from one or more sensors capable of providing images (e.g., cameras) or sensors indicating motion (e.g., motion sensors). The vision component 1208 can perform facial recognition or image analysis to determine an identity of a user and to associate that identity with a user profile associated with the user. In some instances, when a user is facing a camera, the vision component 1208 may perform facial recognition and identify the user with a high degree of confidence. In other instances, the vision component 1208 may have a low degree of confidence of an identity of a user, and the user recognition component 295 may utilize determinations from additional components to determine an identity of a user. The vision component 1208 can be used in conjunction with other components to determine an identity of a user. For example, the user recognition component 295 may use data from the vision component 1208 with data from the audio component 1210 to identify what user's face appears to be speaking at the same time audio is captured by a device 110 the user is facing for purposes of identifying a user who spoke an input to the device 110 and/or the remote system 120.

The overall system of the present disclosure may include biometric sensors that transmit data to the biometric component 1212. For example, the biometric component 1212 may receive data corresponding to fingerprints, iris or retina scans, thermal scans, weights of users, a size of a user, pressure (e.g., within floor sensors), etc., and may determine a biometric profile corresponding to a user. The biometric component 1212 may distinguish between a user and sound from a television, for example. Thus, the biometric component 1212 may incorporate biometric information into a confidence level for determining an identity of a user. Biometric information output by the biometric component 1212 can be associated with specific user profile data such that the biometric information uniquely identifies a user profile of a user.

The radio frequency (RF) component 1214 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 1214 the strength of the signal (e.g., as a received signal strength indication (RSSI)). The RF component 1214 may use the RSSI to determine an identity of a user (with an associated confidence level). In some instances, the RF component 1214 may determine that a received RF signal is associated with a mobile device that is associated with a particular user identifier.

In some instances, a personal device (such as a phone, tablet, wearable or other device) may include some RF or other detection processing capabilities so that a user who speaks an input may scan, tap, or otherwise acknowledge his/her personal device to the device 110. In this manner, the user may "register" with the system 100 for purposes of the system 100 determining who spoke a particular input. Such a registration may occur prior to, during, or after speaking of an input.

The ML component 1216 may track the behavior of various users as a factor in determining a confidence level of the identity of the user. By way of example, a user may adhere to a regular schedule such that the user is at a first location during the day (e.g., at work or at school). In this example, the ML component 1216 would factor in past behavior and/or trends in determining the identity of the user that provided input to the device 110 and/or the remote system 120. Thus, the ML component 1216 may use historical data and/or usage patterns over time to increase or decrease a confidence level of an identity of a user.

In at least some instances, the recognition confidence component 1218 receives determinations from the various components 1208, 1210, 1212, 1214, and 1216, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 1295.

The audio component 1210 may receive data from one or more sensors capable of providing an audio signal (e.g., one or more microphones) to facilitate recognition of a user. The audio component 1210 may perform audio recognition on an audio signal to determine an identity of the user and associated user identifier. In some instances, aspects of device 110 and/or the remote system 120 may be configured at a computing device (e.g., a local server). Thus, in some instances, the audio component 1210 operating on a computing device may analyze all sound to facilitate recognition of a user. In some instances, the audio component 1210 may perform voice recognition to determine an identity of a user.

The audio component 1210 may also perform user identification based on audio data 211 input into the device 110 and/or the remote system 120 for speech processing. The audio component 1210 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 1210 may perform user recognition by comparing speech characteristics represented in the audio data 211 to stored speech characteristics of users (e.g., stored voice profiles associated with the device 110 that captured the spoken user input).

FIG. 13 illustrates user recognition processing as may be performed by the user recognition component 295. The ASR component 250 performs ASR processing on ASR feature vector data 1350. ASR confidence data 1307 may be passed to the user recognition component 295. User recognition data 1295 may be passed back to the ASR component 250 to aid user-specific ASR; for example, through the use of user-specific entity data.

The user recognition component 295 performs user recognition using various data including the user recognition feature vector data 1340, feature vectors 1305 representing voice profiles of users of the system 100, the ASR confidence data 1307, and other data 1309. The user recognition component 295 may output the user recognition data 1295, which reflects a certain confidence that the user input was spoken by one or more particular users. The user recognition data 1295 may include one or more user identifiers (e.g., corresponding to one or more voice profiles). Each user identifier in the user recognition data 1295 may be associated with a respective confidence value, representing a likelihood that the user input corresponds to the user identifier. A confidence value may be a numeric or binned value.

The feature vector(s) 1305 input to the user recognition component 295 may correspond to one or more voice profiles. The user recognition component 295 may use the feature vector(s) 1305 to compare against the user recognition feature vector 1340, representing the present user input, to determine whether the user recognition feature vector 1340 corresponds to one or more of the feature vectors 1305 of the voice profiles. Each feature vector 1305 may be the same size as the user recognition feature vector 1340.

To perform user recognition, the user recognition component 295 may determine the device 110 from which the audio data 211 originated. For example, the audio data 211 may be associated with metadata including a device identifier representing the device 110. Either the device 110 or the remote system 120 may generate the metadata. The system 100 may determine a group profile identifier associated with the device identifier, may determine user identifiers associated with the group profile identifier, and may include the group profile identifier and/or the user identifiers in the metadata. The system 100 may associate the metadata with the user recognition feature vector 1340 produced from the audio data 211. The user recognition component 295 may send a signal to voice profile storage 1385, with the signal requesting only audio data and/or feature vectors 1305 (depending on whether audio data and/or corresponding feature vectors are stored) associated with the device identifier, the group profile identifier, and/or the user identifiers represented in the metadata. This limits the universe of possible feature vectors 1305 the user recognition component 295 considers at runtime and thus decreases the amount of time to perform user recognition processing by decreasing the amount of feature vectors 1305 needed to be processed. Alternatively, the user recognition component 295 may access all (or some other subset of) the audio data and/or feature vectors 1305 available to the user recognition component 295. However, accessing all audio data and/or feature vectors 1305 will likely increase the amount of time needed to perform user recognition processing based on the magnitude of audio data and/or feature vectors 1305 to be processed.

If the user recognition component 295 receives audio data from the voice profile storage 1385, the user recognition component 295 may generate one or more feature vectors 1305 corresponding to the received audio data.

The user recognition component 295 may attempt to identify the user that spoke the speech represented in the audio data 211 by comparing the user recognition feature vector 1340 to the feature vector(s) 1305. The user recognition component 295 may include a scoring component 1322 that determines respective scores indicating whether the user input (represented by the user recognition feature vector 1340) was spoken by one or more particular users (represented by the feature vector(s) 1305). The user recognition component 295 may also include a confidence component 1324 that determines an overall accuracy of user recognition processing (such as those of the scoring component 1322) and/or an individual confidence value with respect to each user potentially identified by the scoring component 1322. The output from the scoring component 1322 may include a different confidence value for each received feature vector 1305. For example, the output may include a first confidence value for a first feature vector 1305a (representing a first voice profile), a second confidence value for a second feature vector 1305b (representing a second voice profile), etc. Although illustrated as two separate components, the scoring component 1322 and the confidence component 1324 may be combined into a single component or may be separated into more than two components.

The scoring component 1322 and the confidence component 1324 may implement one or more trained machine learning models (such as neural networks, classifiers, etc.) as known in the art. For example, the scoring component 1322 may use probabilistic linear discriminant analysis (PLDA) techniques. PLDA scoring determines how likely it is that the user recognition feature vector 1340 corresponds to a particular feature vector 1305. The PLDA scoring may generate a confidence value for each feature vector 1305 considered and may output a list of confidence values associated with respective user identifiers. The scoring component 1322 may also use other techniques, such as GMMs, generative Bayesian models, or the like, to determine confidence values.

The confidence component 1324 may input various data including information about the ASR confidence 1307, speech length (e.g., number of frames or other measured length of the user input), audio condition/quality data (such as signal-to-interference data or other metric data), fingerprint data, image data, or other factors to consider how confident the user recognition component 295 is with regard to the confidence values linking users to the user input. The confidence component 1324 may also consider the confidence values and associated identifiers output by the scoring component 1322. For example, the confidence component 1324 may determine that a lower ASR confidence 1307, or poor audio quality, or other factors, may result in a lower confidence of the user recognition component 295. Whereas a higher ASR confidence 1307, or better audio quality, or other factors, may result in a higher confidence of the user recognition component 295. Precise determination of the confidence may depend on configuration and training of the confidence component 1324 and the model(s) implemented thereby. The confidence component 1324 may operate using a number of different machine learning models/techniques such as GMM, neural networks, etc. For example, the confidence component 1324 may be a classifier configured to map a score output by the scoring component 1322 to a confidence value.

The user recognition component 295 may output user recognition data 1295 specific to a one or more user identifiers. For example, the user recognition component 295 may output user recognition data 1295 with respect to each received feature vector 1305. The user recognition data 1295 may include numeric confidence values (e.g., 0.0-1.0, 0-1000, or whatever scale the system is configured to operate). Thus, the user recognition data 1295 may output an n-best list of potential users with numeric confidence values (e.g., user identifier 123—0.2, user identifier 234—0.8). Alternatively or in addition, the user recognition data 1295 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 295 may output an n-best list of user identifiers with binned confidence values (e.g., user identifier 123—low, user identifier 234—high). Combined binned and numeric confidence value outputs are also possible. Rather than a list of identifiers and their respective confidence values, the user recognition data 1295 may only include information related to the top scoring identifier as determined by the user recognition component 295. The user recognition component 295 may also output an overall confidence value that the individual confidence values are correct, where the overall confidence value indicates how confident the user recognition component 295 is in the output results. The confidence component 1324 may determine the overall confidence value.

The confidence component 1324 may determine differences between individual confidence values when determining the user recognition data 1295. For example, if a difference between a first confidence value and a second confidence value is large, and the first confidence value is above a threshold confidence value, then the user recognition component 295 is able to recognize a first user (associated with the feature vector 1305 associated with the first confidence value) as the user that spoke the user input with a higher confidence than if the difference between the confidence values were smaller.

The user recognition component 295 may perform thresholding to avoid incorrect user recognition data 1295 being output. For example, the user recognition component 295 may compare a confidence value output by the confidence component 1324 to a threshold confidence value. If the confidence value does not satisfy (e.g., does not meet or exceed) the threshold confidence value, the user recognition component 295 may not output user recognition data 1295, or may only include in that data 1295 an indicator that a user that spoke the user input could not be recognized. Further, the user recognition component 295 may not output user recognition data 1295 until enough user recognition feature vector data 1340 is accumulated and processed to verify a user above a threshold confidence value. Thus, the user recognition component 295 may wait until a sufficient threshold quantity of audio data of the user input has been processed before outputting user recognition data 1295. The quantity of received audio data may also be considered by the confidence component 1324.

The user recognition component 295 may be defaulted to output binned (e.g., low, medium, high) user recognition confidence values. However, such may be problematic in certain situations. For example, if the user recognition component 295 computes a single binned confidence value for multiple feature vectors 1305, the system may not be able to determine which particular user originated the user input. In this situation, the user recognition component 295 may override its default setting and output numeric confidence values. This enables the system to determine a user, associated with the highest numeric confidence value, originated the user input.

The user recognition component 295 may use other data 1309 to inform user recognition processing. A model(s) or other component of the user recognition component 295 may be trained to take other data 1309 as an input feature when performing user recognition processing. Other data 1309 may include a variety of data types depending on system configuration and may be made available from other sensors, devices, or storage. The other data 1309 may include a time of day at which the audio data 211 was generated by the device 110 or received from the device 110, a day of a week in which the audio data 211 was generated by the device 110 or received from the device 110, etc.

The other data 1309 may include image data or video data. For example, facial recognition may be performed on image data or video data received from the device 110 from which the audio data 211 was received (or another device). Facial recognition may be performed by the user recognition component 295. The output of facial recognition processing may be used by the user recognition component 295. That is, facial recognition output data may be used in conjunction with the comparison of the user recognition feature vector 1340 and one or more feature vectors 1305 to perform more accurate user recognition processing.

The other data 1309 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 1309 may include data indicating a type of the device 110. Different types of devices may include, for example, a smart watch, a smart phone, a tablet, and a vehicle. The type of the device 110 may be indicated in a profile associated with the device 110. For example, if the device 110 from which the audio data 211 was received is a smart watch or vehicle belonging to a user A, the fact that the device 110 belongs to user A may increase a user recognition confidence value associated with user A and/or decrease a user recognition confidence value associated with user B.

The other data 1309 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the vehicle generated the audio data 211. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the device 110 may indicate global coordinates and associated locations (e.g., work, home, etc.). One or more user profiles may also or alternatively indicate the global coordinates.

The other data 1309 may include data representing activity of a particular user that may be useful in performing user recognition processing. For example, a user may have recently entered a code to disable a home security alarm. A device 110, represented in a group profile associated with the home, may have generated the audio data 211. The other data 1309 may reflect signals from the home security alarm about the disabling user, time of disabling, etc. If a mobile device (such as a smart phone, Tile, dongle, or other device) known to be associated with a particular user is detected proximate to (for example physically close to, connected to the same Wi-Fi network as, or otherwise nearby) the device 110, this may be reflected in the other data 1309 and considered by the user recognition component 295.

Depending on system configuration, the other data 1309 may be configured to be included in the user recognition feature vector data 1340 so that all the data relating to the user input to be processed by the scoring component 1322 may be included in a single feature vector. Alternatively, the other data 1309 may be reflected in one or more different data structures to be processed by the scoring component 1322.

Figure 14:
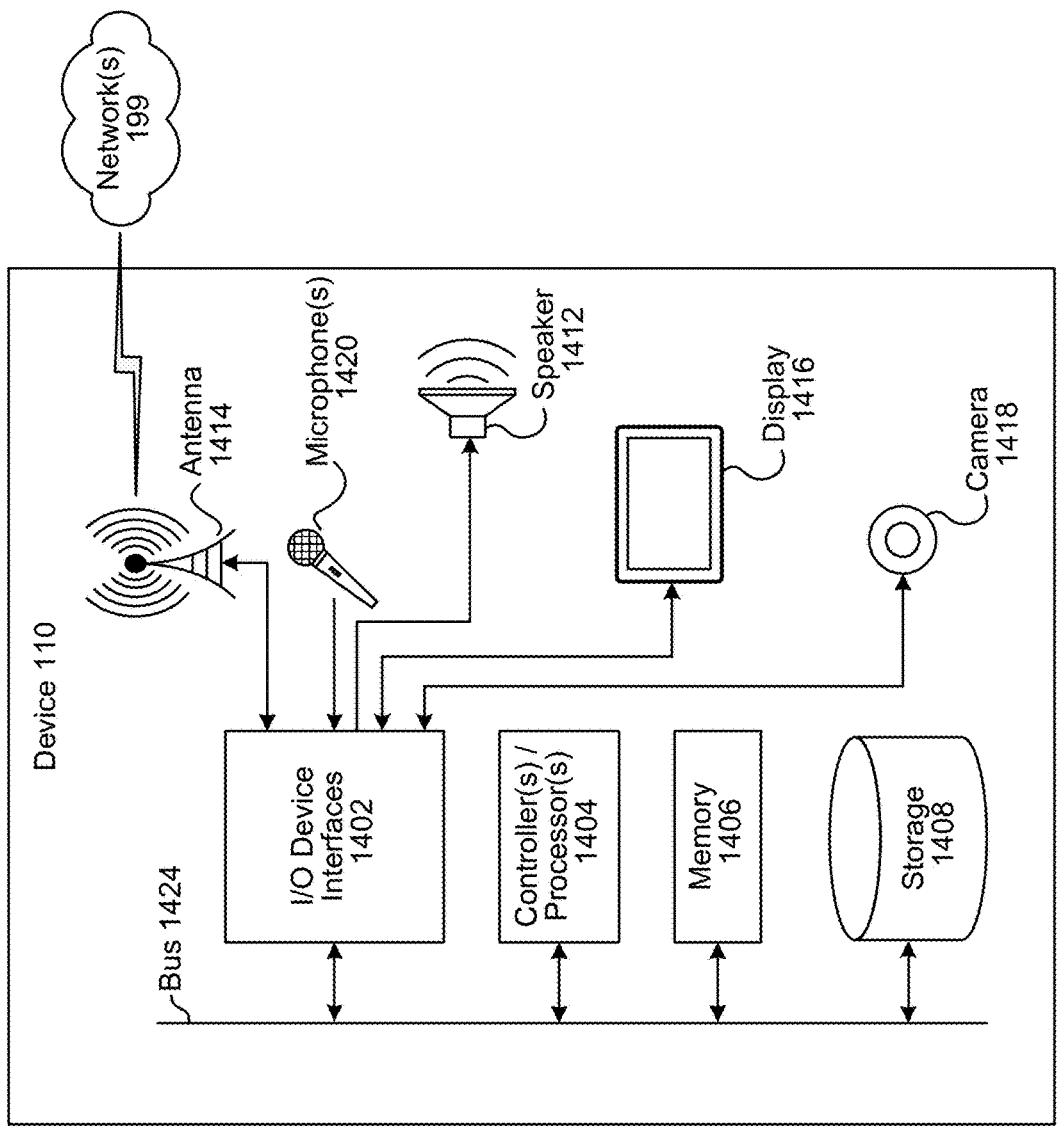
FIG. 14 is a block diagram conceptually illustrating example components of a device, according to embodiments of the present disclosure.
Figure 15:
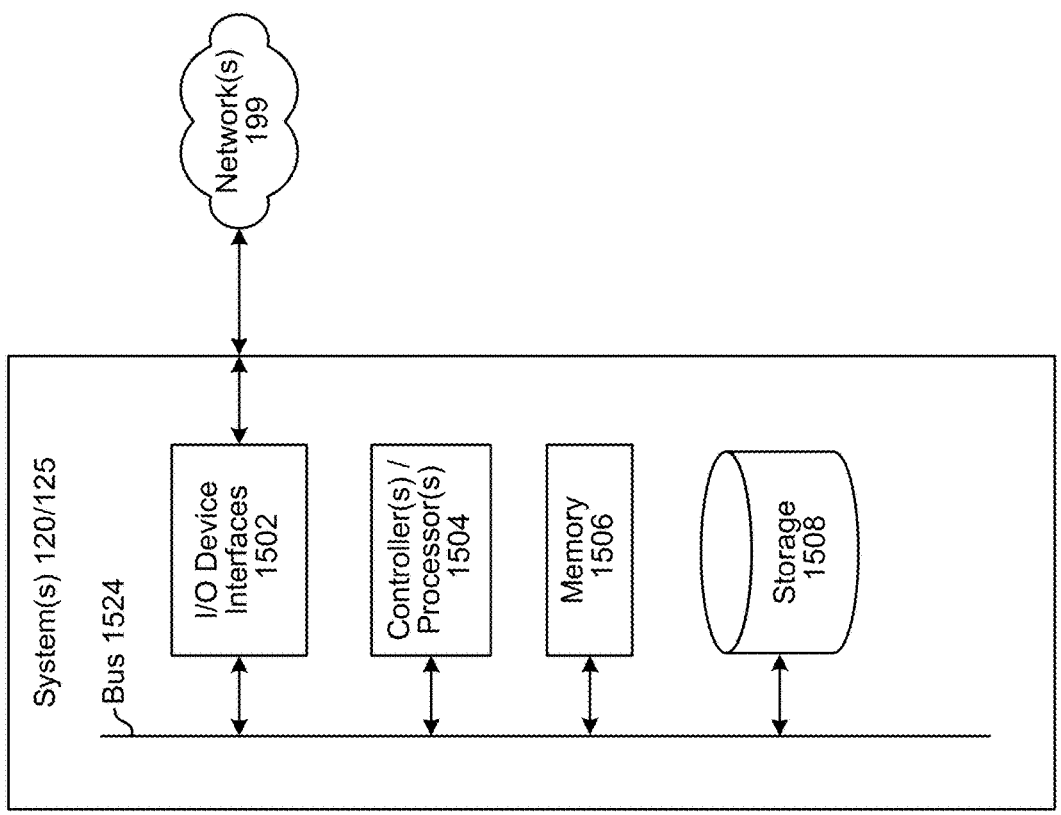
FIG. 15 is a block diagram conceptually illustrating example components of a system, according to embodiments of the present disclosure.

FIG. 14 is a block diagram conceptually illustrating a device 110 that may be used with the system. FIG. 15 is a block diagram conceptually illustrating example components of a remote device, such as the remote system 120, which may assist with ASR processing, NLU processing, etc., and a skill support system 292. A system (120/292) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/292) may be included in the overall system 100 of the present disclosure, such as one or more remote systems 120 for performing ASR processing, one or more remote systems 120 for performing NLU processing, one or more skill support systems 292, etc. In operation, each of these systems may include computer-readable and computer-executable instructions that reside on the respective device (120/292), as will be discussed further below.

Each of these devices (110/120/292) may include one or more controllers/processors (1404/1504), which may each include a central processing unit (CPU) for processing data and computer-readable instructions, and a memory (1406/1506) for storing data and instructions of the respective device. The memories (1406/1506) may individually include volatile random access memory (RAM), non-volatile read only memory (ROM), non-volatile magnetoresistive memory (MRAM), and/or other types of memory. Each device (110/120/292) may also include a data storage component (1408/1508) for storing data and controller/processor-executable instructions. Each data storage component (1408/1508) may individually include one or more non-volatile storage types such as magnetic storage, optical storage, solid-state storage, etc. Each device (110/120/292) may also be connected to removable or external non-volatile memory and/or storage (such as a removable memory card, memory key drive, networked storage, etc.) through respective input/output device interfaces (1402/1502).

Computer instructions for operating each device (110/120/292) and its various components may be executed by the respective device's controller(s)/processor(s) (1404/1504), using the memory (1406/1506) as temporary "working" storage at runtime. A device's computer instructions may be stored in a non-transitory manner in non-volatile memory (1406/1506), storage (1408/1508), or an external device(s). Alternatively, some or all of the executable instructions may be embedded in hardware or firmware on the respective device in addition to or instead of software.

Each device (110/120/292) includes input/output device interfaces (1402/1502). A variety of components may be connected through the input/output device interfaces (1402/1502), as will be discussed further below. Additionally, each device (110/120/292) may include an address/data bus (1424/1524) for conveying data among components of the respective device. Each component within a device (110/120/292) may also be directly connected to other components in addition to (or instead of) being connected to other components across the bus (1424/1524).

Referring to FIG. 14, the device 110 may include input/output device interfaces 1402 that connect to a variety of components such as an audio output component such as a speaker 1412, a wired headset or a wireless headset (not illustrated), or other component capable of outputting audio. The device 110 may also include an audio capture component. The audio capture component may be, for example, a microphone 1420 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1416 for displaying content. The device 110 may further include a camera 1418.

Via antenna(s) 1414, the input/output device interfaces 1402 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1402/1502) may also include communication components that allow data to be exchanged between devices such as different physical servers in a collection of servers or other components.

The components of the device(s) 110, the remote system 120, or a skill support system 292 may include their own dedicated processors, memory, and/or storage. Alternatively, one or more of the components of the device(s) 110, the remote system 120, or a skill support system 292 may utilize the I/O interfaces (1402/1502), processor(s) (1404/1504), memory (1406/1506), and/or storage (1408/1508) of the device(s) 110, remote system 120, or the skill support system 292, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the remote system 120, and a skill support system 292, as described herein, are illustrative, and may be located as a stand-alone device or may be included, in whole or in part, as a component of a larger device or system.

As illustrated in FIG. 16, multiple devices (110*a*-110*n*, 120, 292) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a display device 110*f*, a smart television 110*g*, a washer/dryer 110*h*, a refrigerator 110*i*, and/or a microwave 110*j* may be connected to the network(s) 199 through a wireless service provider, over a Wi-Fi or cellular network connection, or the like. Other devices are included as network-connected support devices, such as the remote system 120, the skill support system(s) 292, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the remote system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving first input audio data corresponding to a first utterance;
   performing user recognition processing using the first input audio data to determine a user profile corresponding to the first input audio data;
   performing speech processing on the first input audio data to determine natural language understanding (NLU) data including an intent to initiate a communication session and a first entity corresponding to a target of the communication session;
   performing entity resolution on the first entity to determine first entity resolution data including at least a first score associated with a first target contact candidate and a second score associated with a second target contact candidate;
   determining, based on a comparison of the first score and the second score, that the first entity resolution data is potentially ambiguous;
   determining first historical data representing prior communication sessions associated with the user profile;
   in response to determining that the first entity resolution data is potentially ambiguous, using a model to process the first entity resolution data and the first historical data to determine second entity resolution data including a third score associated with the first target contact candidate and third entity resolution data including a fourth score associated with the second target contact candidate;
   determining, based at least in part on a comparison between the third score and the fourth score, that the third score indicates a confidence associated with the first target contact candidate that meets or exceeds a threshold; and
   in response to determining that the third score meets or exceeds the threshold, initiating a first communication session with a device associated with the first target contact candidate without outputting a request to disambiguate the first target contact candidate and the second target contact candidate.

2. The computer-implemented method of claim 1, further comprising:
   generating second historical data using the first historical data, the first communication session, and the first target contact candidate;
   receiving second input audio data corresponding to a second utterance;
   processing, using the model and the second historical data, third entity resolution data determined from the second input audio data to determine fourth entity resolution data; and
   initiating an action based on the fourth entity resolution data.

3. The computer-implemented method of claim 1, further comprising:
   determining that the NLU data does not include an indication of a communications system for carrying the first communication session;
   determining a first candidate communications system and a second candidate communications system corresponding to the intent to initiate the communication session;
   processing, using the model and the first historical data, the first candidate communications system and the second candidate communications system to determine a first probability associated with the first candidate communications system and a second probability associated with the second candidate communications system;
   determine, based on the first probability and the second probability, a communications system for carrying the first communication session; and
   initiating the first communication session over the communications system.

4. A computer-implemented method comprising:
   receiving first input data;
   determining the first input data corresponds to a user profile;
   performing natural language understanding (NLU) processing on the first input data to determine first NLU data including an intent to initiate an action with respect to a target contact;
   performing entity resolution on the first NLU data to determine first entity resolution data including at least a first target contact candidate and a second target contact candidate;
   determining that the first entity resolution data includes at least two target contact candidates;
   determining a first confidence value associated with the first target contact candidate;
   in response to the first entity resolution data includes the at least two target contact candidates, determining, using the first entity resolution data and first historical data representing prior actions associated with the user profile, second entity resolution data including the first confidence value associated with at least the first target contact candidate; and
   initiating, based at least in part on the first confidence value associated with the second entity resolution data, a first action with respect to the first target contact candidate without outputting a request to disambiguate the first target contact candidate and the second target contact candidate.

5. The computer-implemented method of claim 4, further comprising:
   determining a second confidence value associated with the second target contact candidate;
   comparing the first confidence value and the second confidence value, wherein determining the second entity resolution data is additionally performed in response to comparing the first confidence value and the second confidence value;

determining, using at least the first historical data, a third confidence value associated with the first target contact candidate; and determining, based at least on the third confidence value, that the first input data represents an intent to initiate the action with respect to the first target contact candidate.

6. The computer-implemented method of claim 4, further comprising:

performing user recognition processing on at least the first input data to determine first user recognition data including a first candidate user profile and a second candidate user profile;

determining that the first user recognition data includes at least two candidate user profiles;

in response to determining that the first user recognition data includes at least two candidate user profiles, processing the first user recognition data and the first historical data to determine third entity resolution data associated with the first candidate user profile; and setting, based on the third entity resolution data, the first candidate user profile as a source of the first action, wherein the first historical data is associated with the first candidate user profile.

7. The computer-implemented method of claim 6, further comprising:

determining that a first entity represented in the first input data corresponds to a common noun; and determining a relationship corresponding to the common noun using the first historical data, wherein performing the entity resolution is additionally based on a contact list corresponding to the first candidate user profile and the relationship.

8. The computer-implemented method of claim 5, further comprising:

determining a first candidate communications system and a second candidate communications system corresponding to the intent to initiate the action;

processing, using the first historical data, the first candidate communications system and the second candidate communications system to determine a communications system for executing the first action; and initiating the first action over the communications system.

9. The computer-implemented method of claim 5, further comprising:

determining a first candidate communications system and a second candidate communications system corresponding to the intent to initiate the action;

outputting a request to disambiguate the first candidate communications system and the second candidate communications system;

receiving second input data;

performing natural language processing on the second input data to determine second NLU data including an indication of the first candidate communications system; and initiating the first action over the first candidate communications system.

10. The computer-implemented method of claim 5, further comprising:

determining a first candidate location and a second candidate location associated with the action;

outputting a request to disambiguate the first candidate location and the second candidate location;

receiving second input data;

performing natural language processing on the second input data to determine second NLU data including an indication of the first candidate location; and initiating the first action based on the first candidate location.

11. The computer-implemented method of claim 5, further comprising:

determining second historical data based on the first historical data, the first action, and the first target contact candidate;

processing the second historical data and third entity resolution data associated with second input data to determine fourth entity resolution data; and initiating a second action based on the fourth entity resolution data.

12. The computer-implemented method of claim 5, further comprising:

receiving second input data corresponding to a second utterance;

performing NLU processing on the second input data to determine second NLU data including third entity resolution data;

determining, based on the second NLU data, that the second input data relates to a request for information regarding a previous event;

processing the third entity resolution data and the first historical data to determine fourth entity resolution data including a fourth score associated with a first entity candidate;

determining, based at least on the fourth score, that the first entity candidate represents a first entity associated with the previous event; and processing the request for information using the first entity candidate.

13. A system, comprising:

at least one processor; and at least one memory comprising instructions that, when executed by the at least one processor, cause the system to:

receive first input data;

determine the first input data corresponds to a user profile;

perform natural language understanding (NLU) processing on the first input data to determine first NLU data including an intent to initiate an action with respect to a target contact;

perform entity resolution on the first NLU data to determine first entity resolution data including at least a first target contact candidate and a second target contact candidate;

determine that the first entity resolution data includes at least two target contact candidates;

determine a first confidence value associated with the first target contact candidate;

in response to the first entity resolution data includes the at least two target contact candidates, determine, using the first entity resolution data and first historical data representing prior actions associated with the user profile, second entity resolution data including the first confidence value associated with at least the first target contact candidate; and initiate, based at least in part on the first confidence value associated with the second entity resolution data, a first action with respect to the first target contact candidate without outputting a request to disambiguate the first target contact candidate and the second target contact candidate.

14. The system of claim 13, wherein the at least one memory further comprises instructions that, when executed by the at least one processor, further cause the system to:
perform user recognition processing on at least the first input data to determine first user recognition data including a first candidate user profile and a second candidate user profile;
determine that the first user recognition data includes at least two candidate user profiles;
in response to determining that the first user recognition data includes at least two candidate user profiles, process the first user recognition data and the first historical data to determine third entity resolution data associated with the first candidate user profile; and
set, based on the third entity resolution data, the first candidate user profile as a source of the first action, wherein the first historical data is associated with the first candidate user profile.

15. The system of claim 14, wherein the at least one memory further comprises instructions that, when executed by the at least one processor, further cause the system to:
determine that a first entity represented in the first input data corresponds to a common noun; and
determine a relationship corresponding to the common noun using the first historical data, wherein performing the entity resolution is additionally based on a contact list corresponding to the first candidate user profile and the relationship.

16. The system of claim 13, wherein the at least one memory further comprises instructions that, when executed by the at least one processor, further cause the system to:
determine a first candidate communication system and a second candidate communication system corresponding to the intent to initiate the action;
process, using the first historical data, the first candidate communication system and the second candidate communication system to determine a communications system for executing the first action; and
initiate the first action over the first candidate communication system.

17. The system of claim 13, wherein the at least one memory further comprises instructions that, when executed by the at least one processor, further cause the system to:
determine a first candidate communication system and a second candidate communication system corresponding to the intent to initiate the action;
output a request to disambiguate the first candidate communication system and the second candidate communication system;
receive second input data;
perform natural language processing on the second input data to determine second NLU data including an indication of the first candidate communication system; and
initiate the first action over the first candidate communication system.

18. The system of claim 13, wherein the at least one memory further comprises instructions that, when executed by the at least one processor, further cause the system to:
determine a first candidate location and a second candidate location associated with the action;
output a request to disambiguate the first candidate location and the second candidate location;
receive second input data;
perform natural language processing on the second input data to determine second NLU data including an indication of the first candidate location; and
initiate the first action based on the first candidate location.

19. The system of claim 13, wherein the at least one memory further comprises instructions that, when executed by the at least one processor, further cause the system to:
determine second historical data based on the first historical data, the first action, and the first target contact candidate;
process the second historical data and third entity resolution data associated with second input data to determine fourth entity resolution data; and
initiating a second action based on the fourth entity resolution data.

20. The system of claim 13, wherein the at least one memory further comprises instructions that, when executed by the at least one processor, further cause the system to:
receive second input data corresponding to a second utterance;
perform NLU processing on the second input data to determine second NLU data including third entity resolution data;
determine, based on the second NLU data, that the second input data relates to a request for information regarding a previous event;
process the third entity resolution data and the first historical data to determine fourth entity resolution data including a fourth score associated with a first entity candidate;
determine, based at least on the fourth score, that the first entity candidate represents a first entity associated with the previous event; and
process the request for information using the first entity candidate.

* * * * *